United States Patent
Naiki

[11] Patent Number: 5,870,133
[45] Date of Patent: Feb. 9, 1999

[54] LASER SCANNING DEVICE AND LIGHT SOURCE THEREOF HAVING TEMPERATURE CORRECTION CAPABILITY

[75] Inventor: Toshio Naiki, Toyokawa, Japan

[73] Assignee: Minolta Co., Ltd., Osaka, Japan

[21] Appl. No.: 637,846

[22] Filed: Apr. 25, 1996

[30] Foreign Application Priority Data

Apr. 28, 1995 [JP] Japan ................................. 7-105190

[51] Int. Cl.⁶ .............. B41J 2/47; B41J 4/435; H01S 3/00
[52] U.S. Cl. .............. 347/247; 347/258; 347/257; 359/820; 372/34
[58] Field of Search ................................. 347/134, 258, 347/257, 242, 247; 372/36, 34, 101, 107; 250/201.5, 578.1; 359/196, 217, 820

[56] References Cited

U.S. PATENT DOCUMENTS

| | | | |
|---|---|---|---|
| 4,641,023 | 2/1987 | Ando et al. | 359/824 |
| 4,907,017 | 3/1990 | Azuma | 347/242 |
| 4,918,702 | 4/1990 | Kimura | 372/34 |
| 5,148,190 | 9/1992 | Iizuka | 347/244 |
| 5,255,015 | 10/1993 | Noethen et al. | 347/247 |

FOREIGN PATENT DOCUMENTS

| | | |
|---|---|---|
| 59034512 | 2/1984 | Japan . |
| 03179420 | 8/1991 | Japan . |
| 03179421 | 8/1991 | Japan . |
| 04107518 | 4/1992 | Japan . |
| 04320079 | 11/1992 | Japan . |
| 6-17264 | 3/1994 | Japan . |
| 07056059 | 3/1995 | Japan . |

*Primary Examiner*—N. Le
*Assistant Examiner*—L. Anderson
*Attorney, Agent, or Firm*—Burns, Doane, Swecker & Mathis, LLP

[57] ABSTRACT

A light source device has a semiconductor laser element, a collimator lens, a lens barrel for holding the collimator lens, first and second lens barrel support member and a laser support member. The lens barrel support members are formed of the same type of material as that of the lens barrel and engage the lens barrel at a surface parallel to the optical axis of the collimator lens. The laser support member is formed of a different type material from that of the lens barrel support members, and joins the lens barrel support members at a surface perpendicular to the optical axis of the collimator lens.

12 Claims, 23 Drawing Sheets

FIG. 13

| M1 $\alpha 1$ | M2 $\alpha 2$ |
|---|---|
| X | L total − X |
| L total ||

Fluctuation Factor

| |
|---|
| (1) Change in the axial chromatic aberration of collimater lens 2 and scanning lenses 207,208,209 |
| (2) Change of the refrective power of collimater lens 2 |
| (3) Change of the refrective power of scanning lenses 207,208,209 |

| |
|---|
| Spatial Fluctuation between the collimeter lens 2 and semiconductor laser element 1 |

LASER SCANNING DEVICE AND LIGHT SOURCE THEREOF HAVING TEMPERATURE CORRECTION CAPABILITY

BACKGROUND OF THE INVENTION

1. Field of the Invention

The present invention relates to a light source device and a laser scanning device used as an optical writing unit such as a laser beam printer (LBP), digital plain paper copier (PPC) or the like.

2. Description of the Related Art

Conventional image writing performed by laser beam printers and digital plain paper copiers is accomplished using a laser scanning device. In the light source device comprised of a laser light source and collimator lens for confining the laser light in parallel rays and which is among the structural components of this laser scanning device, the laser light source generates heat which causes thermal expansion of the members which retain heat, thereby causing fluctuation of the distance between the collimator lens and light generation point of the laser light source. When a semiconductor laser element is used as a laser light source, the wavelength of the output laser beam fluctuates in accordance with the temperature fluctuation. As a result, the convergence state of the laser beam emitted from the light source changes, and causes changes in the spot diameter of image formation of the laser beam on the scanned surface, thereby precluding the formation of fine detail images.

Means have been proposed to rectify the aforesaid disadvantage, such as, for example, Japanese Unexamined Patent Application No. HEI 4-320079, which discloses a light source comprising a laser support member which supports a laser light source, and a lens support member which supports a collimator lens connected to said lens support member. In this light source, expansion of the laser support member due to heat elevation, and fluctuation of the oscillation wavelength of the laser light source mutually cancel one another, such that the spot on the scanned surface does not change regardless of temperature fluctuation.

Another conventional construction is known wherein the change in the focal length induced by spatial change between the semiconductor laser element and the collimator lens is compensated for by a plastic lens. This solution utilizes the heat-induced change in the shape and refractive index of the plastic lens.

FIG. 23 briefly shows the construction of a light source device used in the aforesaid conventional laser scanning devices. This light source device 120 comprises a laser light source 121, collimator lens 122, support member 123, and lens barrel 124.

In general, when a semiconductor laser element is used as a laser light source 121, the emission position inescapable varies during manufacture. Accordingly, in order to maintain errors arising from discrepancies in the laser emission position which affect the focal length of the entire optical unit within a permissible range, the distance separating the laser light source 121 and collimator lens 122 must be individually adjusted during assembly.

Therefore, a light source device 120, which includes a support member 123 for stationary support of laser light source 121 and a lens barrel 124 for supporting a collimator lens 122, normally comprises at least two or more members. The support member 123 and lens barrel 124 have different required characteristics (e.g., hardness, processing characteristics, thermal conductivity and the like), and therefore are made of different materials.

In the conventional light source device 120 shown in FIG. 23, the support member 123 and the lens barrel 124 formed of different types of materials are joined at a surface 125 parallel to the optical axis 126 of collimator lens 122. In this construction, when laser light source 121 generates heat, the support member 123 and lens barrel 124 are subject to thermal expansion at respectively different linear thermal coefficients of expansion, such that the joining surface 125 between the support member 123 and lens barrel 124 is subject to both rubbing and smooth sliding. That is, support member 123 and lens barrel 124 may adversely affect reproducibility due to thermal variation.

When the positional relationship between support member 123 and lens barrel 124 is not displaced with excellent reproducibility in conjunction with temperature variation, the actual amount of change cannot be accurately predicted relative to temperature fluctuation regardless of a calculated value of change even when the change in the distance between the laser light source 121 and collimator lens 122 induced by temperature fluctuation is calculated using a linear thermal coefficient of expansion.

Accordingly, when a conventional laser light source device 120 is used as a light source of a laser scanning device, it cannot be predicted how the total focal length of the laser scanning device will be changed by temperature, such that the change in the total focal length of the optical unit induced by temperature fluctuation of said part is extremely difficult to correct by moving the other lenses in the optical unit or changing the properties of a specific lens.

SUMMARY OF THE INVENTION

A main object of the present invention is to provide a laser scanning device which displaces the distance between a laser light source and a collimator lens relative to temperature fluctuations with excellent reproducibility.

Another object of the present invention is to provide a laser scanning device capable of readily correcting changes in the total focal length of the optical unit relative to temperature fluctuations.

These objects are attained by providing a first laser scanning device of the present invention comprising:
a laser light source which emits a laser beam;
a collimator lens which incidents the laser beam emitted from said laser light source;
a lens barrel for holding said collimator lens; and
a lens barrel support member which is formed of the same type of material as that of said lens barrel and engages said lens barrel at a surface parallel to the optical axis of said collimator lens.

According to the first invention having the aforesaid construction, the lens barrel supporting member which joins the lens barrel at a surface parallel to the optical axis of the collimator lens is formed of the same type of material and has the same linear thermal coefficient of expansion, such that there is no slipping or shifting on the joint surface under conditions of thermal expansion. The lens barrel can change position in the direction of the optical axis of the collimator lens relative to the barrel supporting member.

These objects are further attained by providing a second laser scanning device of the present invention comprising:
a laser light source which emits a laser beam;
a collimator lens which incidents the laser beam emitted from said laser light source;

a lens barrel for holding said collimator lens;

a lens barrel support member for supporting said lens barrel; and a laser support member formed of a different type material from that of said lens barrel support member, and which joins said lens barrel support member at a surface perpendicular to the optical axis of said collimator lens.

According to the second invention having the aforesaid construction, the laser support member and the lens barrel support member are formed of different type materials and have different linear thermal coefficients of expansion and are joined at a surface perpendicular to the optical axis of the collimator lens, such that sliding and shifting of the joining surface does not occur in the direction of the optical axis under conditions of thermal expansion.

These and other object, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 13 is a model of the relationship when dissimilar material 1 and material 2 are joined;

DETAILED DESCRIPTION OF THE PREFERRED EMBODIMENTS

The preferred embodiments of the laser scanning device of the present invention are described hereinafter with reference to the accompanying drawings.

Figure 1:
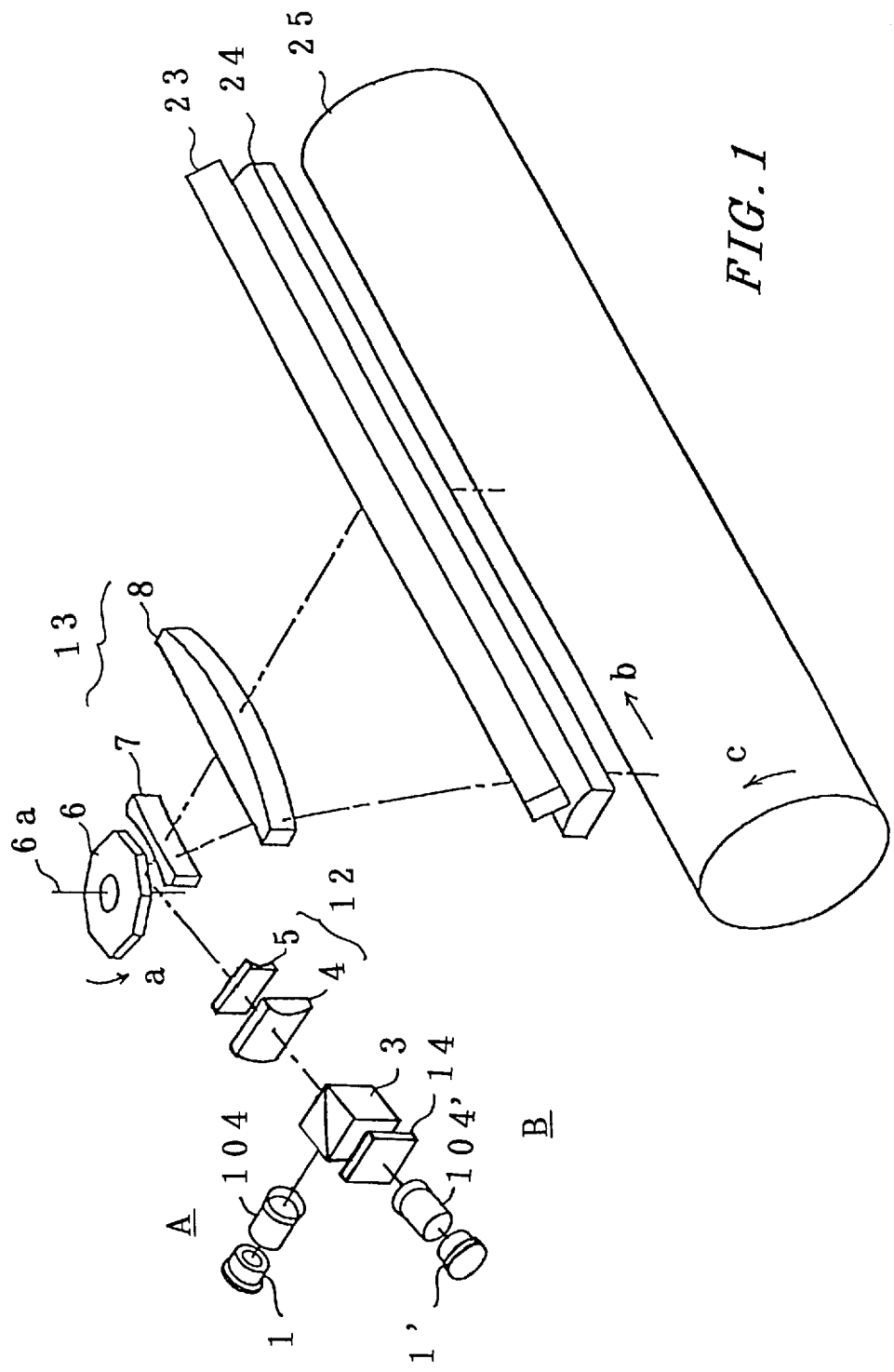
FIG. 1 perspective view of the optical unit of a laser scanning device of a first embodiment of the present invention.

FIG. 1 is a perspective view of an optical unit of a laser scanning device of the first embodiment of the present invention. The laser scanning device of the first embodiment performs operation of writing two parallel scan lines simultaneously on the surface of a photosensitive drum 25 using two laser beams emitted from two semiconductor laser elements 1 and 1'.

The laser scanning device of the first embodiment comprises two semiconductor laser elements 1 and 1' which emit laser beams, lens barrels 104 and 104' which internally support collimator lenses 2 and 2', half-wave plate 14, beam splitter 3, cylindrical lens unit 12, polygonal mirror 6, scanning lens unit 13, mirror 23, cylindrical lens 24, and the scanned surface of photosensitive drum 25.

The half-wave plate 14 is disposed medially to semiconductor laser element 1' and lens barrel 104', and acts to rotate the polarization plane of the laser beam emitted from semiconductor laser element 1' in a manner described later.

Cylindrical lens unit 12 comprises a cylindrical lens 4 having a positive refractive power only in the subscan direction, and cylindrical lens 5 having a negative refractive power only in the subscan direction and formed of plastic material.

Scanning lens unit 13 comprises a scanning lens 7 having a negative refractive power, and scanning lens 8 having a positive refractive power.

Cylindrical lens 24 has a positive refractive power only in the subscan direction and is formed of plastic material.

Figure 2:
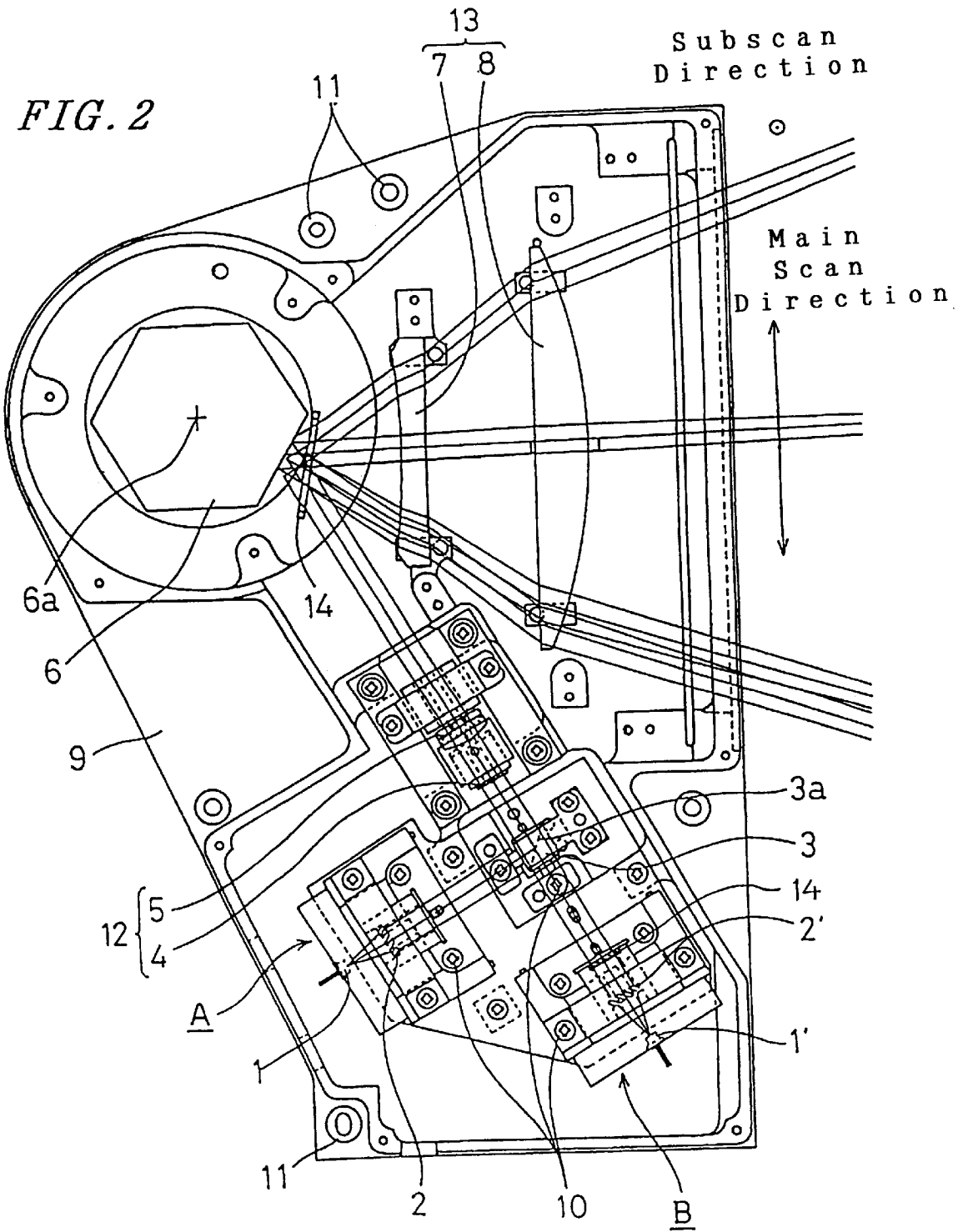
FIG. 2 is a top view of the laser scanning device of the first embodiment of the present invention.
Figure 3:
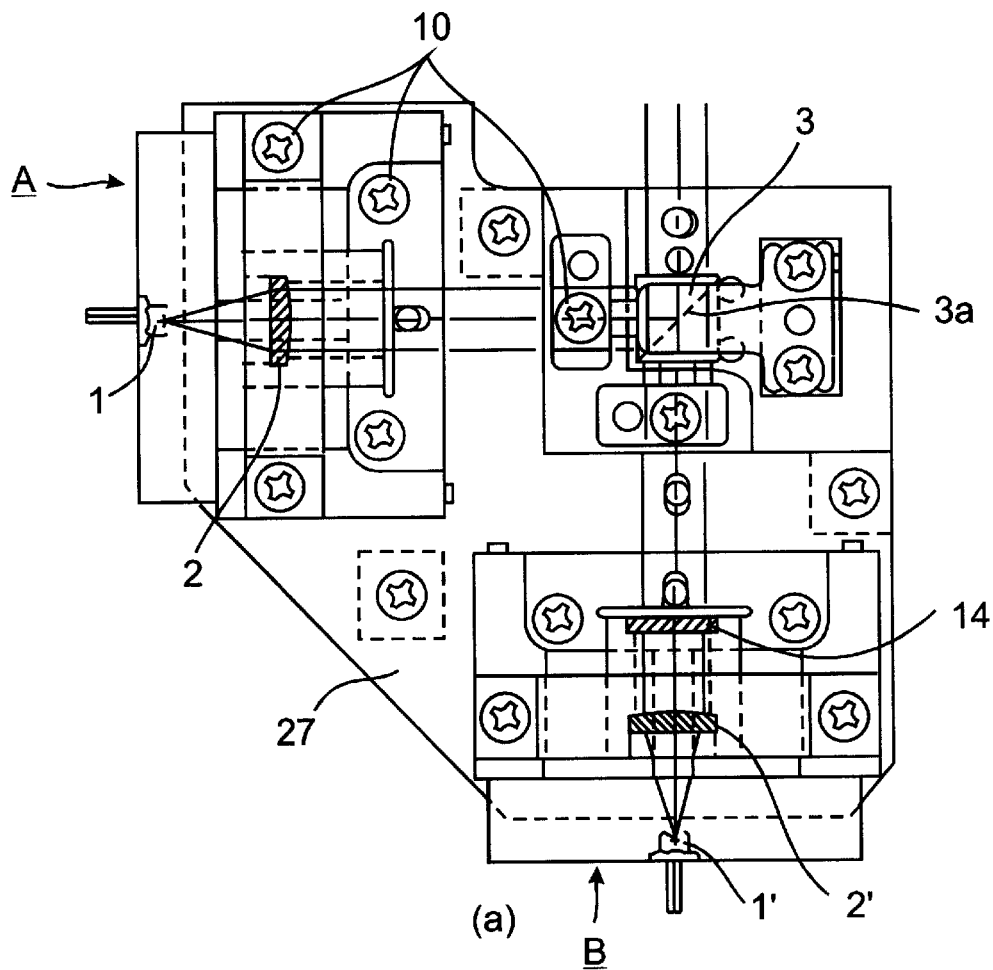
FIGS. 3(a) and 3(b) are a partial enlargement showing the construction of TABLE mounting the semiconductor laser element, collimator lens, and beam splitter installed in the laser scanning device of the first embodiment.
Figure 3:
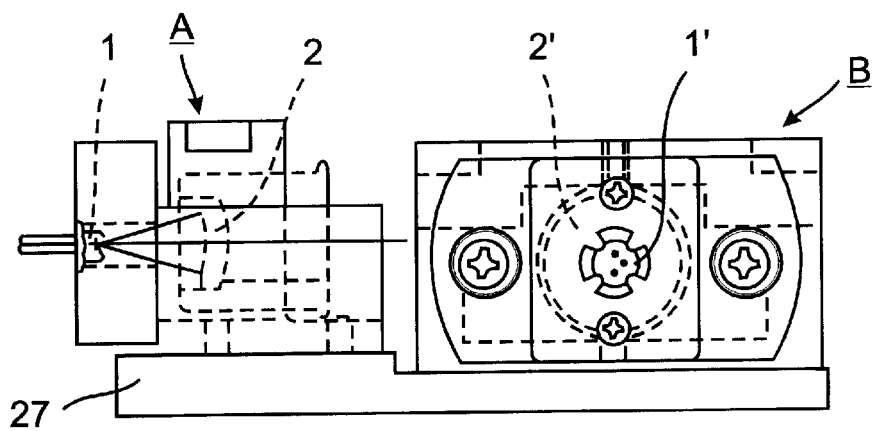

FIG. 2 is a top view of the vicinity of the light source of the laser scanning device of a first embodiment of the present invention. FIG. 3 is a partial enlargement showing semiconductor laser elements 1 and 1', collimator lenses 2 and 2', beam splitter 3, and their respective mountings on mounting platforms 27. FIGS. 3(a) and 3(b) respectively show a top view and front view of the aforesaid area.

The laser scanning device of the first embodiment must provide a high degree of precision and be capable of maintaining stable precision over time. Therefore, a metal mounting base plate 9 is used to mount various optical components from light source device A to scanning lens unit 13 via screws 10. Mounting plate 9 is further provided with counter-bored holes 11 for mounting said laser scanning device to the body of a printer, copier or the like.

A laser beam emitted from a semiconductor laser element 1 is converted to parallel rays by collimator lens 2 and enters beam splitter 3. On the other hand, a laser beam emitted from semiconductor laser element 1' is converted to parallel rays by collimator lens 2' and is transmitted through half-wave plate 14 to enter beam splitter 3.

Half-wave plate 14 is described in detail hereinafter. In order to improve the efficiency of image formation using a laser beam, it is desirable that the laser beam emitted from semiconductor laser element 1 entering beam splitter 3 has a high reflectivity, and that the laser beam emitted from semiconductor laser element 1' has a high transmittance. In order to improve the transmittance efficiency and reflection efficiency of the beam splitter, an arrangement may be considered wherein, for example, two semiconductor elements may be used to emit laser beam linearly polarized light with the polarization planes of said laser beams emitted from two semiconductor laser elements being arranged so as to intersect, and a beam splitter is used which has a reflective surface for reflecting the laser beams in a predetermined deflection direction, such that only one laser beam is reflected by said reflective surface.

Since the semiconductor laser elements generally have difference spread angles relative to a direction intersecting the direction of deflection, the cross section of the laser beams are elliptical. Therefore, in the construction of the optical unit of the first embodiment which uses an optical unit which combines two laser beams from the beam splitter 3 to the photosensitive drum, when the semiconductor laser elements 1 and 1' are arranged such that the laser beam polarization planes mutually intersect, the intensity distribution of the two beams are different in the main scan direction and subscan direction.

When the polarization plane of the two laser beams emitted from semiconductor laser elements 1 and 1' are identical, it is necessary to interpose an optical element such as a half-wave plate 14 or rotator or the like between collimator lens 2 and beam splitter 3, or between collimator lens 2' and beam splitter 3, so as to rotate by 90° the polarization plane of the laser beam. By interposing such an optical element as described above, it is possible to convert the polarization plane of only one direction without changing the intensity distribution of the two laser beams.

Figure 4:
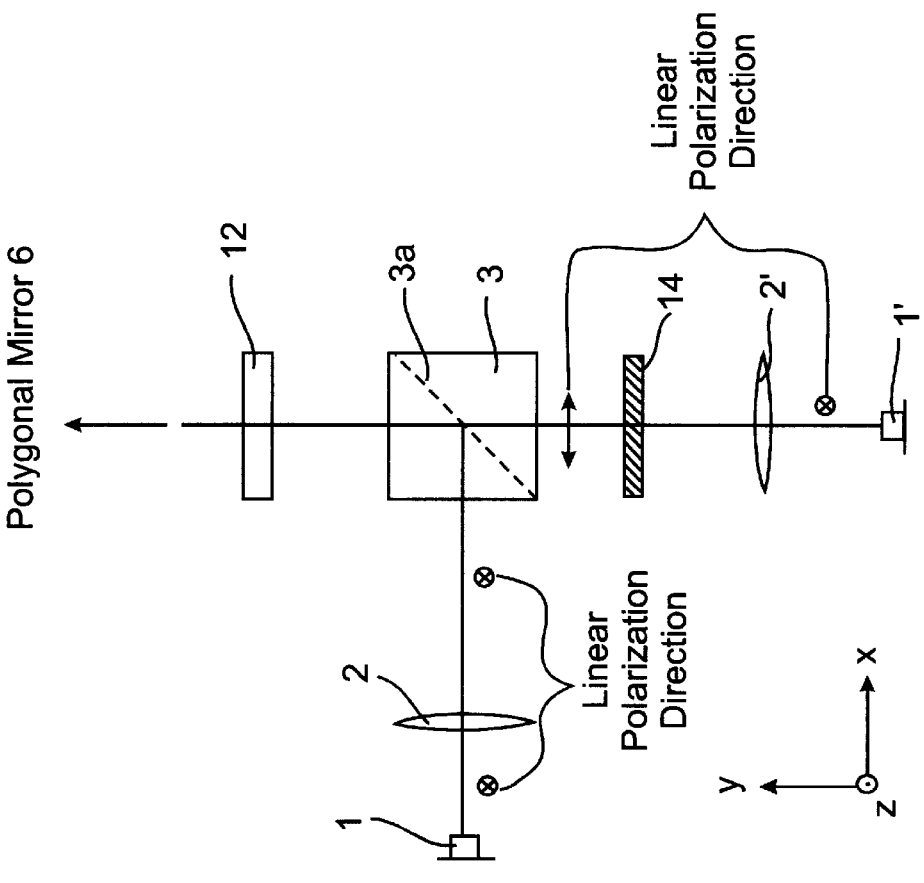
FIGS. 4(a) and 4(b) briefly show the layout of a light source when a polarization beam splitter and half-wave plate are used in a light source device of the laser scanning device of the first embodiment.
Figure 4:
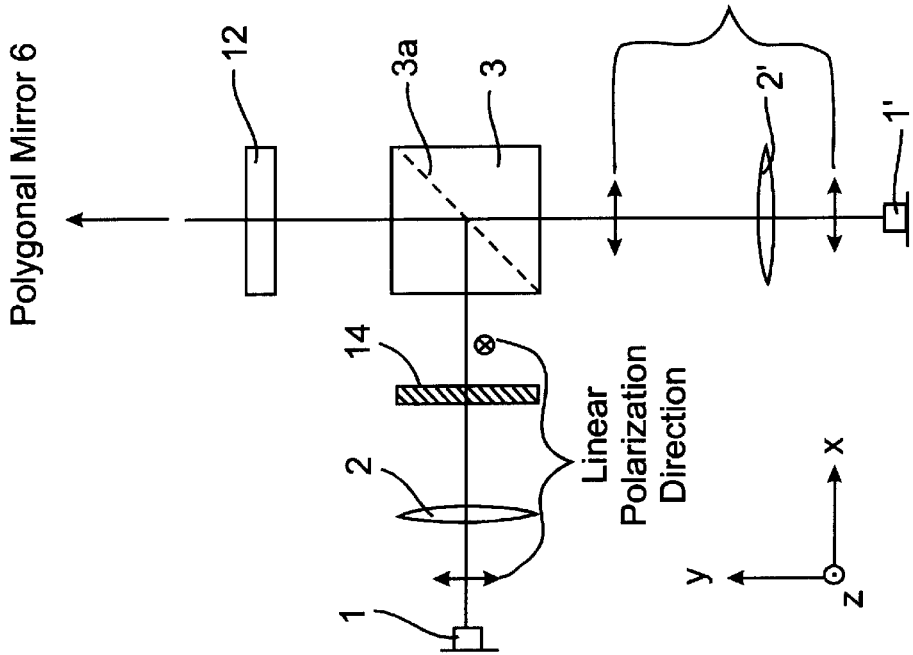

FIGS. 4(a) and 4(b) show an example layout wherein a half-wave plate 14 is interposed between a semiconductor laser element 1 or semiconductor laser element 1' and a beam splitter 3 corresponding to polarization directions of two laser beams having linear polarization. In FIG. 4, the X-axis and the Y-axis express the propagation directions of the two laser beams emitted from semiconductor laser elements 1 and 1', and the Z-axis expresses a direction perpendicular to the X-Y plane. A polarization beam splitter is used as beam splitter 3.

In FIG. 4(a), directly after emission from semiconductor laser elements 1 and 1', the X-Y plane of both laser beams form a polarization plane. The laser beam emitted from semiconductor laser element 1 is transmitted through the half-wave plate 14 positioned medially to beam splitter 3 and collimator lens 2, so as to rotate the polarization plane 90° to form the Z-X plane. The interference film 3a of polarization beam splitter 3 is arranged so as to reflect the laser beam passing through the beam splitter on the X-Y polarization plane to the Z-X plane, such that the reflectivity of the laser beam emitted from the semiconductor laser element 1 in beam splitter 3 can be effectively increased.

In FIG. 4(b), directly after emission from semiconductor laser elements 1 and 1', the laser beams on the Y-Z plane and Z-X plane form a polarization plane. The laser beam emitted from semiconductor laser 1' is transmitted through the half-wave plate 14 disposed medially to beam splitter 3 and collimator lens 2 to rotate the polarization plane 90° to form the X-Y plane. Interference film 3a of the polarization beam splitter is arranged so as to transmit the laser beam of the X-Y plane and reflect the laser beam of the Z-X plane, thereby increasing the reflectivity of the laser beam emitted from semiconductor laser element 1 in beam splitter 3.

In the first embodiment using the construction shown in FIG. 4(b), the half-wave plate 14 may be inserted on either the side of semiconductor laser elements 1 or 1'. The half-wave plate 14 is arranged so as to produce a mutual intersection of the laser beam polarization planes on the interference film 3a.

The description continues below with reference to FIGS. 1 and 2. The laser beam emitted from semiconductor element 1 is reflected by interference film 3a provided within beam splitter 3, whereas the laser beam emitted from semiconductor laser element 1' is transmitted by interference film 3a, and thereafter both laser beams continue parallel to the optical axis of the optical unit.

At this time, as shown in FIG. 3(b), the semiconductor laser elements 1 and 1' and collimator lenses 2 and 2' are provided at different levels on mounting platform 27 so as to allow the height to be varied in the subscan direction by a predetermined distance, such that on the polygonal mirror side of beam splitter 3 the optical axes of the respective laser beams are rendered parallel in the vicinity of the optical axis of the optical unit with a predetermined spacing therebetween in the subscan direction. FIG. 3(b), emphasizes the distance set between the two laser beams in the subscan direction, i.e., a predetermined distance set between semiconductor laser elements 1 and 1' and collimator lenses 2 and 2'.

The two laser beams pass through beam splitter 3 and are rendered parallel to the optical axis of the optical unit such that the optical axes of said respective beams have a predetermined spacing therebetween in the subscan direction in the vicinity of the optical axis of the optical unit, said two laser beams being focused in the subscan direction in the vicinity of the deflection plane of polygonal mirror 6 via cylindrical lens unit 12 comprising two cylindrical lenses 4 and 5. Cylindrical lenses 4 and 5 are respectively provided with positive and negative power only in the subscan direction, such that when combined as cylindrical lens unit 12, said cylindrical lens unit 12 has a positive power only in the subscan direction.

The since the laser beams are not condensed in the main scan direction by the cylindrical lens unit 12, the cross section of the two laser beams comprises two lines having length in the main scan direction in the vicinity of the deflection plane of polygonal mirror 6. The action of cylindrical lens unit 12 works in concert with the cylindrical lens 24 which has a positive power in the subscan direction, so as to correct shifting of the deflection plane of polygonal mirror 6. Cylindrical lens 5 works in concert with cylindrical lens 24 to compensate for the change in total focal length of the optical unit due to temperature fluctuation by working in concert with the light source unit. This action is described later.

Figure 5:
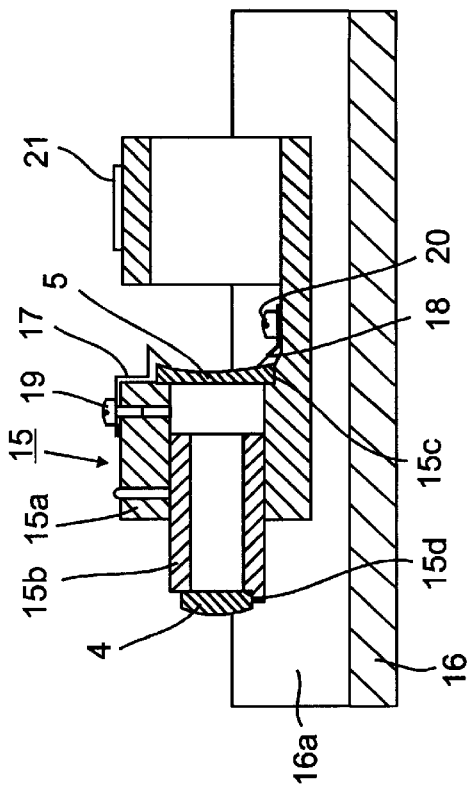
FIGS. 5(a), 5(b) and 5(c) are partial enlargements showing the construction of a first cylindrical lens unit installed in the laser scanning device of FIG. 2.
Figure 5:
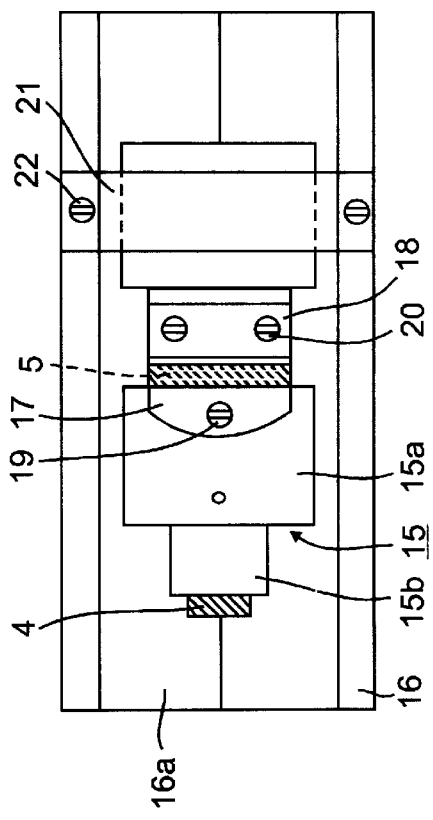
Figure 5:
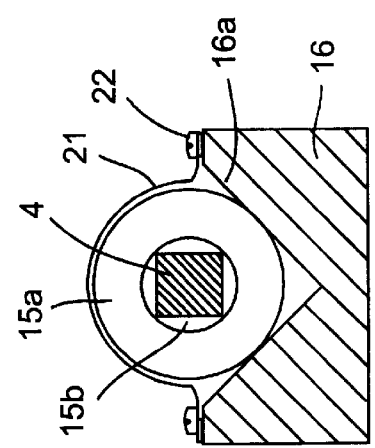
Figure 6:
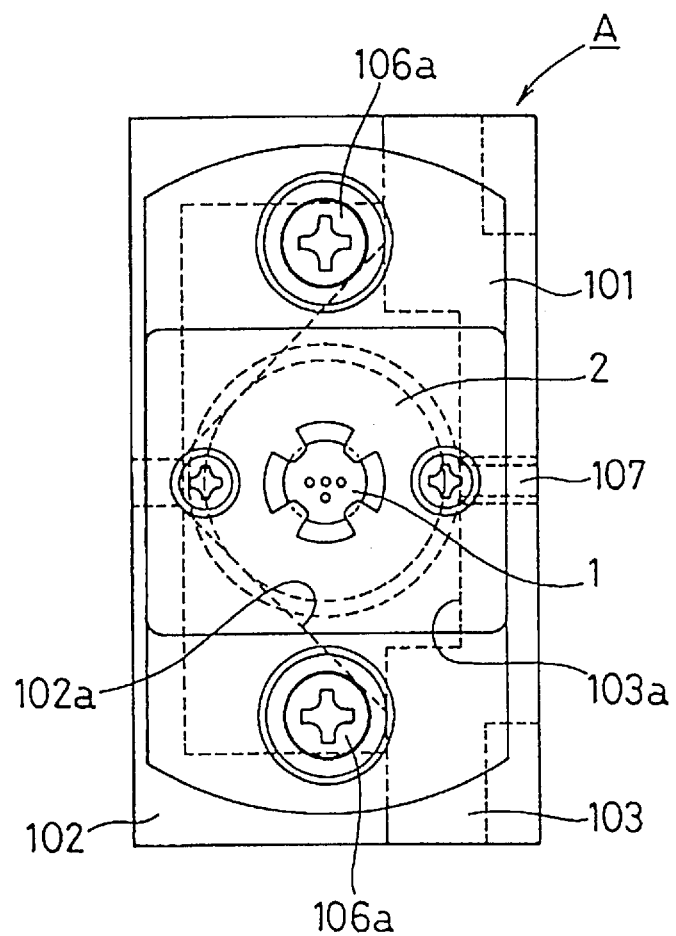
FIG. 6 is an elevation view of the light source device of a laser scanning device of the first embodiment.
Figure 7:
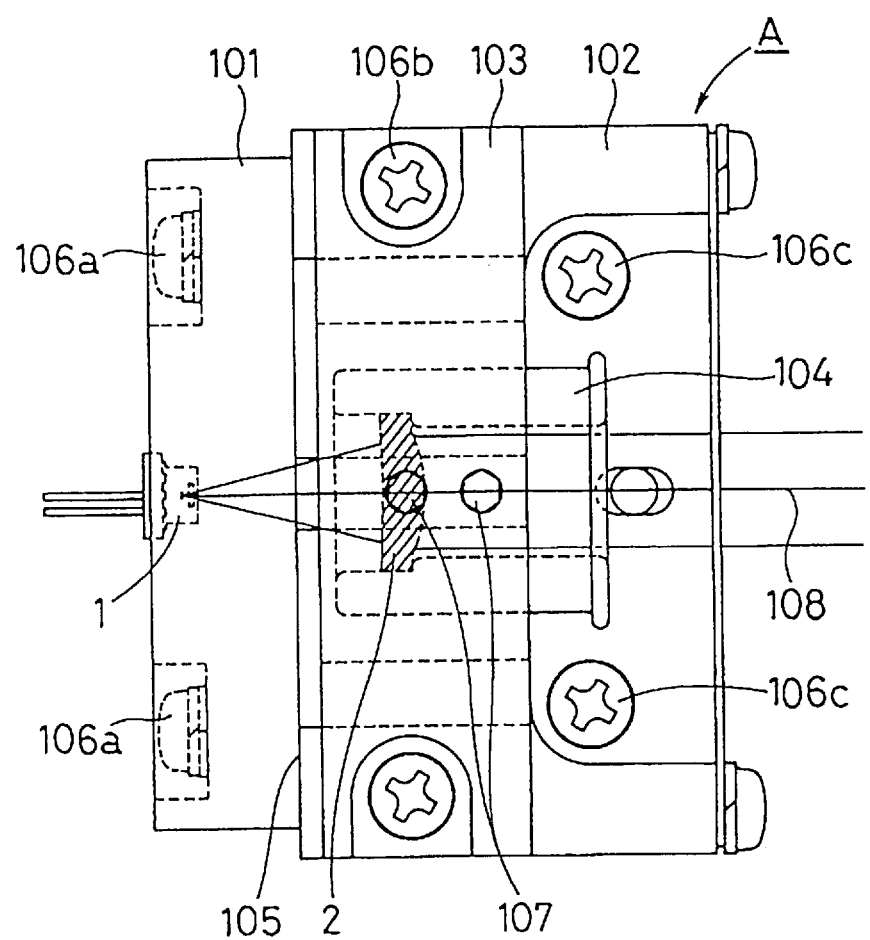
FIG. 7 is a top view of the light source device of a laser scanning device of the first embodiment.
Figure 8:
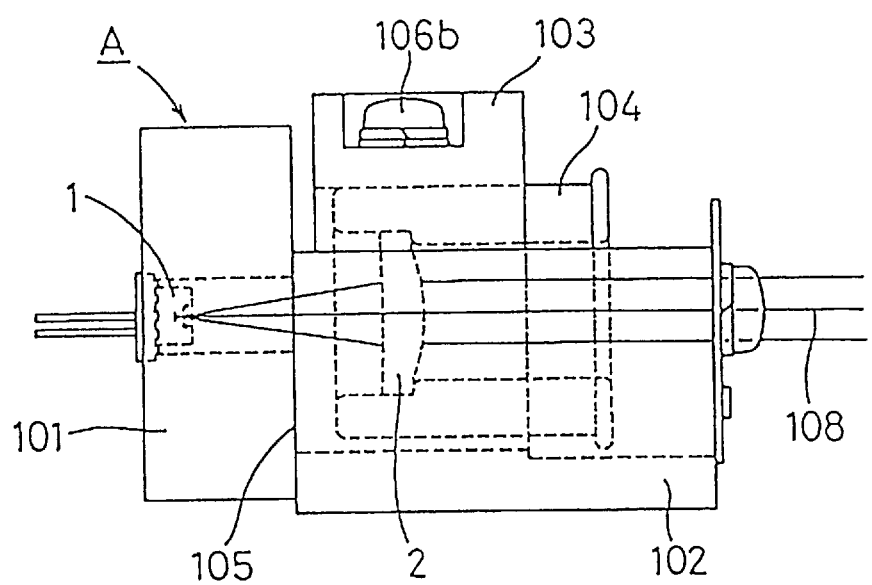
FIG. 8 is a side view of the light source device of a laser scanning device of the first embodiment.
Figure 9:
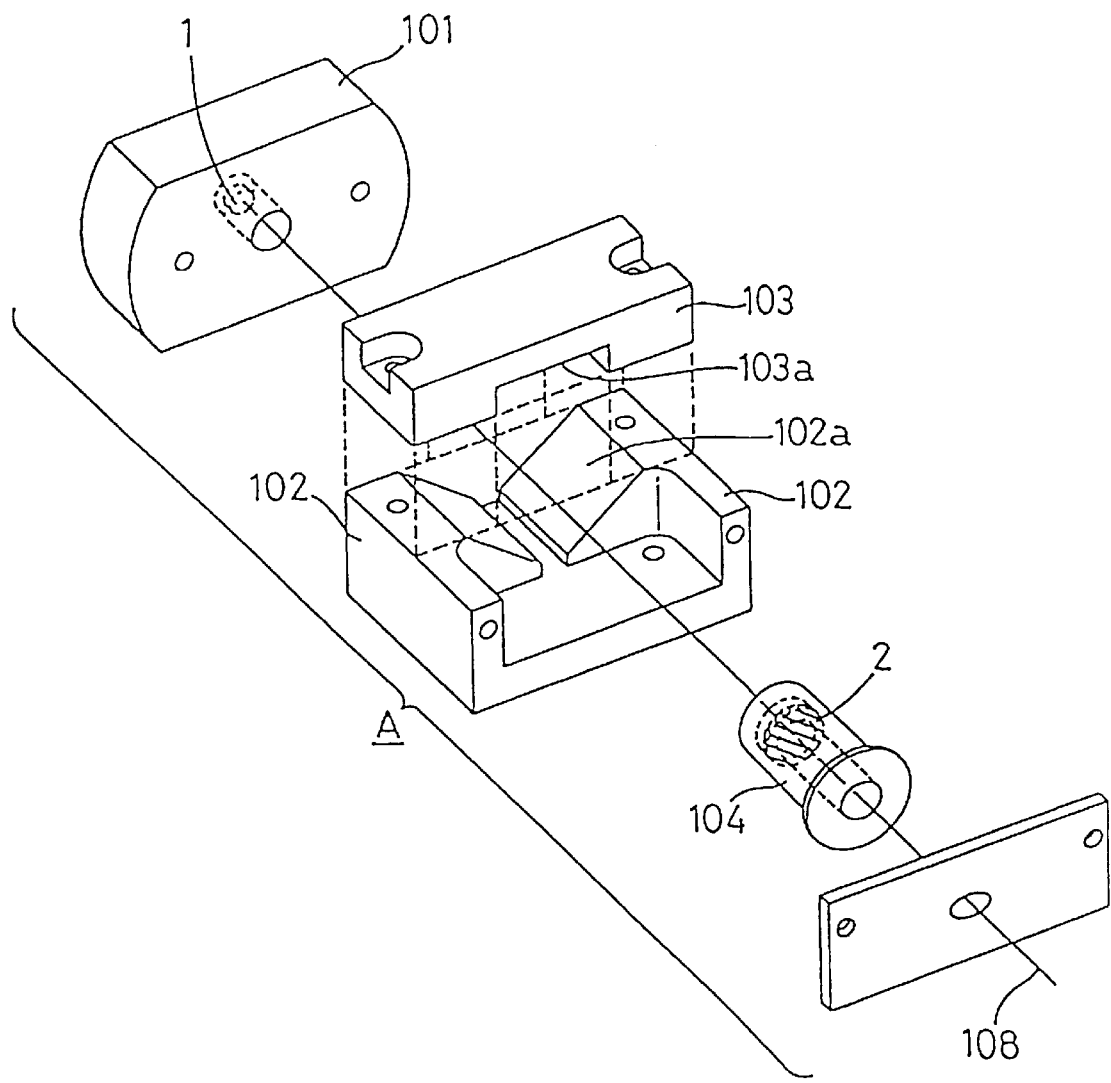
FIG. 9 is an exploded perspective view of the light source device of a laser scanning device of the first embodiment.

FIG. 5 is a partial enlargement showing lens barrel 15 which houses cylindrical lenses 4 and 5, and mounting platform 16 with attached mounting plate 9 which fixedly supports lens barrel 15. FIG. 5(a) is a front view, and FIG. 5(b) is a section view shown from the side, and FIG. 5(c) is a top view. Lens barrel 15 comprises an interior member 15b for installing cylindrical lens 4, and exterior member 15a for holding interior member 15b and installing cylindrical lens 5.

Platform 16 is rectangular in shape, the top surface of which is provided with a V-shaped channel 16a on a plane parallel to the optical axis. Overall, the lens barrel 15 has a cylindrical shape and is supported in a state of contact with both inclined surfaces of said V-shaped channel 16a. The V-shaped channel 16a supports lens barrel 15 and is formed such that the height of the generating line of cylindrical lens 5 matches the height of the optical axis. Lens barrel 15 is fixedly mounted so as to be unmovable relative to platform 16 via the pressure of a plate spring 21 held by screws 22.

The cylindrical lens 5 is held stationary via pressure exerted by plate springs 17 and 18 at the endface which is not inserted in the interior member 15b of exterior member 15a of the lens barrel 15. Plate springs 17 and 18 are fastened to exterior member 15a via screws 19 and 20, respectively. A flat surface 15c is formed parallel to the main scan direction at a location when confronts the aforesaid endface of exterior member 15a, such that the generating line of the cylinder can be aligned with the height of the subscan line on the optical axis by having a surface parallel to the generating line of the cylinder of cylindrical lens 5 abut the aforesaid flat surface 15c.

A part of interior member 15b of lens barrel 15 is not inserted in exterior member 15a so as to produce therefrom, and has a flat surface 15d formed parallel to the main scan direction at the surface on the optical axis side of the protruding portion. Cylindrical lens 4 is fixedly attached to the endface on the side which is not inserted into exterior member 15a with the flat surface 15d abutting a surface parallel to the generating line of the cylinder so as to align the generating line of the cylinder with the height of the optical axis in the subscan direction.

Cylindrical lenses 4 and 5 are adjustable as described below. First, cylindrical lenses 4 and 5 are attached to interior member 15b and exterior member 15a of lens barrel 15. Then, interior member 15b is inserted into exterior member 15a, and both are rotated and moved in adjustment and subsequently fixed in placed with their spacing on the optical axis of cylindrical lenses 4 and 5 at a predetermined distance with the generating lines of the cylinder in the same direction, thereby forming a lens block.

Platform 16 is mounted on mounting plate 9 after adjustment of the center line of V-shaped channel 16a to match the optical axis of the main device. The lens block is installed on platform 16 for accomplishing optical adjustment only, and may match the center line of the optical axis. Finally, the lens block position is adjusted, i.e., the distance in the optical axis direction of the other optical elements such as the light source and the cylinder generating line are adjusted, and fixed in position by plate spring 21. Thus, the positioning of cylindrical lenses 4 and 5 can be accomplished simply and with excellent precision.

The discussion now returns again to FIGS. 1 and 2. The two laser beams condensed in the subscan direction in the vicinity of the deflection surface of polygonal mirror 6 by cylindrical lens unit 12 are simultaneously deflected in the main scan direction (arrow b direction) of photosensitive drum 25 by means of the rotation of the deflection surface polygonal mirror 6 in the arrow a direction in the drawing. Polygonal mirror 6 is a regular octagonal cylinder having eight reflective surfaces parallel to the rotational axis 6a as deflection surfaces, and is driven by a motor (not illustrated) mounted on the back side of mounting plate 9 so as to be rotated about rotational axis 6a at high speed and constant velocity.

Polygonal mirror 6 is housed within a cover (not illustrated) provided as a dustcover, and the two laser beams which are deflected or impinge the deflection surface of polygonal mirror 6 are transmitted through a glass window 14 (omitted in the drawing) provided on a side wall of the cover.

The two laser beams deflected by the deflection surfaces of polygonal mirror 6 converge in the main scan direction by scanning lens unit 13 which has a positive reflective power in the main scan direction. The two laser beams converge in the subscan direction by means of cylindrical lens 24 which has a positive power in the subscan direction and is arranged medially to the scanning lens unit 13 and the photosensitive drum 25.

Thus, the two laser beams form an image as two spots separated a predetermined distance in the subscan direction on the surface of photosensitive drum 25, and polygonal mirror 6 is rotated so that two parallel scan lines separated by a predetermined distance in the subscan direction are formed simultaneously and scan in the main scan direction. The photosensitive drum 25 is scanned in the subscan direction by rotating said drum in the arrow c direction in the drawing.

In the first embodiment, the scanning lens unit 13 comprising two lenses 7 and 8 in its entirety comprises an fθ lens. The deflection surfaces of polygonal mirror 6 are rotated at uniform high speed and the angular speeds of the deflection angles of the two laser beams deflected by said deflection surfaces are constant, such that if an fθ lens is used, the two laser beams respectively scan photosensitive drum 25 in the main scan direction (arrow b direction in the drawing) at equal speeds.

The construction comprising scanning lens unit 13 and cylindrical lens 24 having a positive power in the subscan direction may be substituted by a toroidal lens having different power in the main scan direction and subscan direction, or an aspherical lens.

The light source device is described hereinafter with reference to FIGS. 6 through 9. Since the previously described laser scanning device uses two laser beams, two light source devices A and B are proved as shown in FIG. 2. Because light source devices A and B have identical constructions with the exception of a mechanism for holding half-wave plate 14, light source device A is described below as representative. FIGS. 6 through 9 respectively show the front view, top view, side view and perspective view of light source device A.

Light source device A comprises a semiconductor laser element 1, collimator lens 2, laser support member 101 for supporting semiconductor laser element 1, lens barrel 104 for installing collimator lens 2, first and second barrel support members 102 and 103 for supporting lens barrel 104.

Laser support member 101 is mounted on first lens barrel support member 102 at a surface 105 which is perpendicular to optical axis 108 of the collimator lens 2 using screws 106a; the position of semiconductor laser element 1 can be adjusted in bidimensionally within a plane perpendicular to optical axis 108 of the collimator lens 2 during mounting. Lens barrel 104 is sandwiched between channel 103a of second lens barrel support member 103 and V-shaped channel 102a of first lens barrel support member 102 so as to be positionally adjustable in the direction of optical axis 108 of the collimator lens 2 by mounting second lens barrel support member 103 on first lens barrel support 102 using screws 106b. After initial adjustment of the distance between semiconductor laser element 1 and collimator lens 2, lens barrel 104 is fixedly attached to first and second lens barrel support members 102 and 103 by tightening screws 107.

Since semiconductor laser element 1 generates heat, a material of high heat conductivity must be used for laser support member 101, whereas the material used for lens barrel 104 and first and second lens barrel support members 102 and 103 must be different types of material from laser support member 101 due to demand for cost reduction and excellent processing qualities. In the first embodiment, iron subjected to a nickel surfacing process is used as the material for laser support member 101, and aluminum is used as the material for lens barrel 104 and first and second lens barrel support members 102 and 103.

Figure 10:
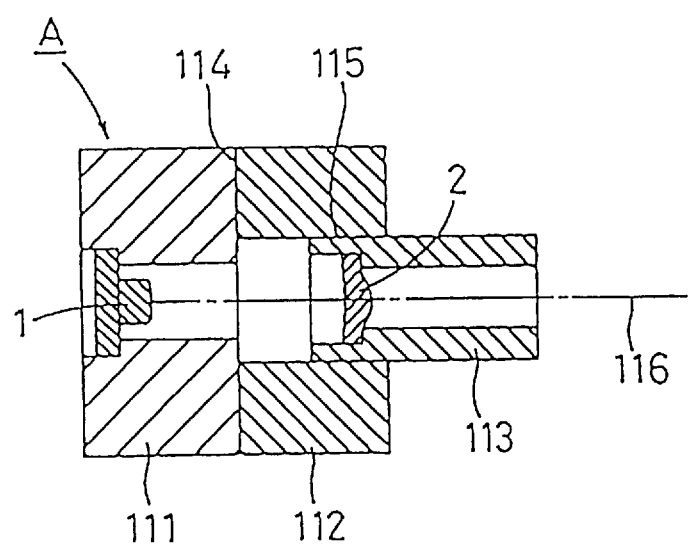
FIG. 10 is a brief construction view of the light source device of the present invention.

FIG. 10 briefly shows the construction of light source device A of the first embodiment. Light source device A comprises a semiconductor laser element 1, collimator lens 2, laser support member 111 for supporting semiconductor laser element 1, lens barrel 113 for installing the collimator lens 2, and a barrel support member 112 for supporting lens barrel 113. In the drawing, laser support member 111 and barrel support member 112 mutually press against one another at a surface 114 which is perpendicular to the optical axis 116 of the collimeter lens 2, such that lens barrel 113 and barrel support member 112 are joined at a surface 115 which is parallel to the optical axis 116 of the collimeter lens 2.

When light source device A has the aforesaid construction, there is no slippage or dislocation which occurs at the aforesaid joining surface 115 even when lens barrel 113 and barrel support member 112 are subject to thermal expansion due to the heat generated by semiconductor laser element 1, because said members are formed of the same type of material having the same linear thermal coefficients of expansion. Laser support member 111 and barrel support member 112 are formed of a different type of material having different linear thermal coefficients of expansion, such that when said members are subject to thermal expansion, a phenomenon occurs with poor reproducibility relative to temperature fluctuation causing loss of friction and slippage at joining surface 114, but slippage and dislocation arising from said phenomenon does not occur in the direction of optical axis 116 of the collimeter lens 2 because said joining surface 114 is a surface perpendicular to the optical axis 116 of the collimeter lens 2.

Accordingly, the distance between semiconductor laser element 1 and collimator lens 2 changes with excellent reproducibility in conjunction with temperature fluctuation, such that the change in said distance induced by temperature fluctuation, and the change in the total focal length of the optical unit resulting therefrom can be accurately predicted. Thus, the total focal length of the optical unit can be accurately corrected using the structural elements other than light source devices A and B within the optical unit.

Numerical examples for the first embodiment are described in the details of temperature compensation of the laser scanning device.

TABLE 1 shows construction data showing numerical examples of the first embodiment. The construction data shown in TABLE 1 comprise specific examples of data of a laser scanning device when the focal length f1 of cylindrical lens 4 is such that f1=30, and the focal length f2 of cylindrical lens 5 is such that f2=−16.

In the TABLE, riy (where i=1, 2, 3 . . . ) represents the radius of curvature in the main scan direction of a No. i surface after beam splitter 3 counting from the light source side; riz (where i=1, 2, 3 . . . ) represents the radius of curvature in the subscan direction of the No. i surface from beam splitter 3 counting from the light source side; di (where i=1, 2, 3 . . . ) represents the axial distance of No. i surface after beam splitter 3 counting from the light source side; and Ni (where i=1, 2, 3) represents the refractive index relative to light rays of 780 nm wavelength of the No. i lens after beam splitter 3 counting from the light source side. The value r1 is designated entering parallel flux of infinite object distance, and the construction of collimator lens 2 and beam splitter 3 are omitted.

Simulation results are shown in TABLE 2 when the environmental temperature was elevated from 20° C. to 40° C. in the laser scanning device shown in TABLE 1. The position of minimum spot diameter in the main scan direction and subscan direction is expressed as a reference scanned surface in millimeter (mm) units.

In the laser scanning device of the first embodiment, the change in total focal length of the optical unit due to temperature fluctuation has excellent reproducibility, such that the aforesaid results can be normally expected relative to change of the focal length. In laser scanning devices using conventional light source devices, there is no reproducibility in operation relative to temperature fluctuations and, therefore, they cannot utilize the various cylindrical lenses described by the numerical examples of the first embodiment.

The temperature compensation conditions of the focal length of the laser scanning device of the first embodiment are described hereinafter in their actual design sequence. The laser scanning device of the first embodiment is specifically designed in the following sequence to compensate for fluctuation of the focal length of the optical unit generated by fluctuation of the environmental temperature.

(1) The refractive power layout in the main scan direction is determined from the spot diameter on the scanned surface and the rotational speed of the polygonal mirror.
(2) The construction of the light source device is determined based on calculations of the focal length fluctuation per unit of temperature of the main scan direction relative to the refractive power layout determined in (1) above.
(3) The refractive power layout of the cylindrical lens with refractive power only in the subscan direction is determined relative to the light source device determined in (2) above.

In the laser scanning device of the first embodiment designed according to the sequence above, the actual design sequence of the light source device and cylindrical lenses is shown. In the following discussion, light source device A is described as an example and is completely identical to light source device B.

Figure 11:
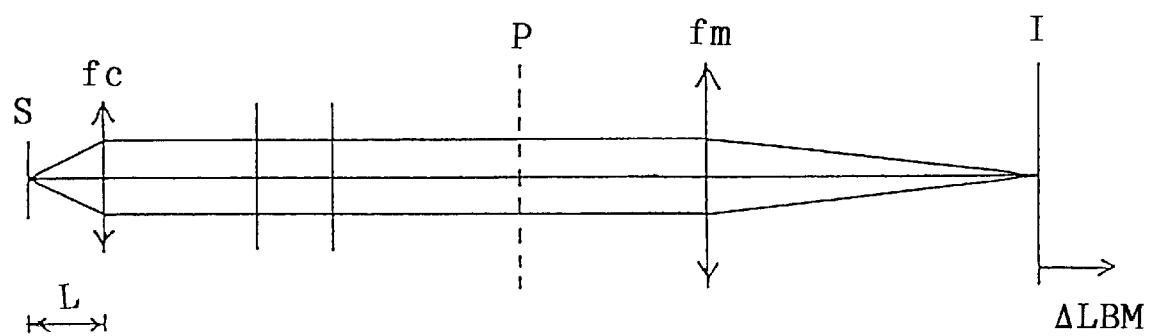
FIG. 11 shows reflective power in the main scan cross section of the laser scanning device of the first embodiment.

FIG. 11 shows the layout of the refractive power of the cross section surface in the main scan direction of the laser scanning device of the first embodiment. In the drawing, reference symbol S refers to the light source, fc refers to the focal length of the collimator lens, fm refers to the focal length of the scanning lens unit in the main scan direction, P refers to the deflection surface, and I refers to the scanned surface. The layout of the refractive power is determined from the desired image characteristics on the scanned surface. Reference symbol L refers to the space between the semiconductor laser element and the collimator lens, and ΔLBM refers to the error (direction from the light source is designated positive) in the optical axis direction from the scanned surface of a position of minimum spot diameter in the main scan direction.

In the laser scanning device of the first embodiment, the primary causes of fluctuation of spot diameter on the scanned surface relative to the environmental temperature in the main scan direction are, in addition to change in the distance between the semiconductor laser element 1 and the collimator lens 2, (1) change in the axial chromatic aberration of collimator lens 2 and scanning lenses 7 and 8 due to fluctuation of the oscillation wavelength of the laser light source, (2) change of the refractive power of collimator lens 2, and (3) change of the refractive power of scanning lenses 7 and 8.

Figure 12:
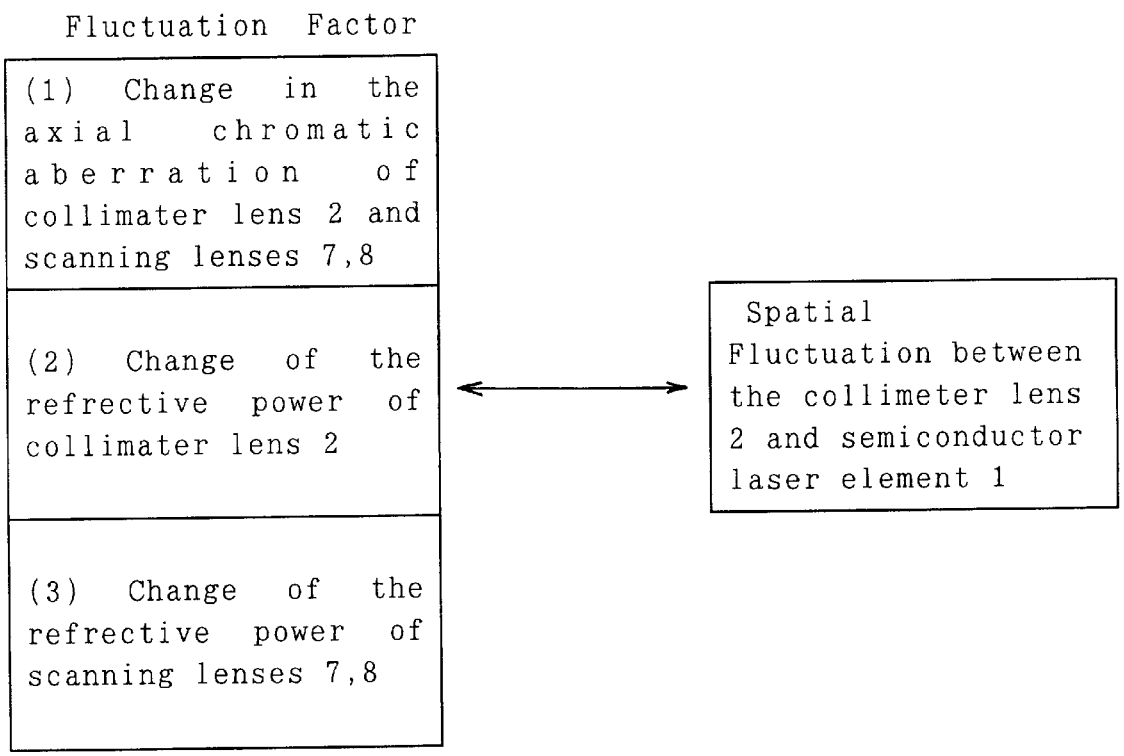
FIG. 12 illustrates temperature compensation of the focal length in the main scan direction of the laser scanning device of the first embodiment.

In the realization of the laser scanning device of the first embodiment, the fluctuations of items (1) and (2) above are canceled in calculations of the design of the light source device by combining the aforesaid four elements in the main scan direction as shown in FIG. 12, i.e., changing the distance between the semiconductor laser element 1 and collimator lens 2.

TABLE 3 shows calculations relative to ΔLBM of fluctuation factors (1) through (3) above when a collimator lens having a focal length fc of 15 mm is used and the environmental temperature fluctuation ΔT is 20° C. The value ΣΔLBM is the sum of all fluctuation factors (1) through (3).

The calculation of ΔLBM in TABLE 3 uses the values determined in TABLE 4 relating to the thermal expansion coefficient α of each component and the temperature change rate dn/dT of the refractive index, and assumes the change in the shape of the lens due to temperature fluctuation as a change which maintains a similar relationship. Accordingly, the radius of curvature of each surface is calculated by multiplying the temperature fluctuation ΔT by the linear thermal coefficient of expansion shown in TABLE 4. Furthermore, the value dλ/dT=0.23 nm/degree is used as the oscillation wavelength change rate dλ/dT induced by temperature change of the semiconductor laser element.

As can be understood from the calculation results shown in TABLE 3, when the environmental temperature fluctuates 20° C. in the reflective power layout of FIG. 11, the position of minimum spot diameter changes in a direction removed from semiconductor laser element 1 by only 1.665 mm in the main scan direction. Therefore, whenever the environmental temperatures changes 20° C., temperature compensation can be achieved in the main scan direction if light source device A is designed such that ΔLBM=1.665 mm, by changing the distance separating the semiconductor laser element 1 and the collimator lens 2.

For example, when light source device A is produced all in aluminum (linear thermal expansion coefficient αAL=23× $10^{-6}$), the generated ΔLBM in light source device A is as described below.

ΔLBM=−2.200 mm

That is, there is over correction in the all aluminum construction. Materials used in light source device A having a value of about ΔLBM=−1.665 mm will have the following value for linear thermal expansion coefficient α.

α=αAL×1.665/2.220=17.3×$10^{-6}$

In light source device A, the laser support member 101 for supporting semiconductor laser element 1, and first and second lens barrel support members 102 and 103 for supporting the lens barrel 104 of the collimator lens 2 must be produced of different materials as previously described.

Thus, the construction of the various components of laser support member 101, and first and second barrel support members 102 and 103 must be determined so that the value of the apparent linear thermal expansion coefficient αM of the overall light source device A (hereinafter the apparent linear thermal expansion coefficient is the weighted mean linear thermal expansion coefficient) includes the contact between the different materials.

Figure 13:
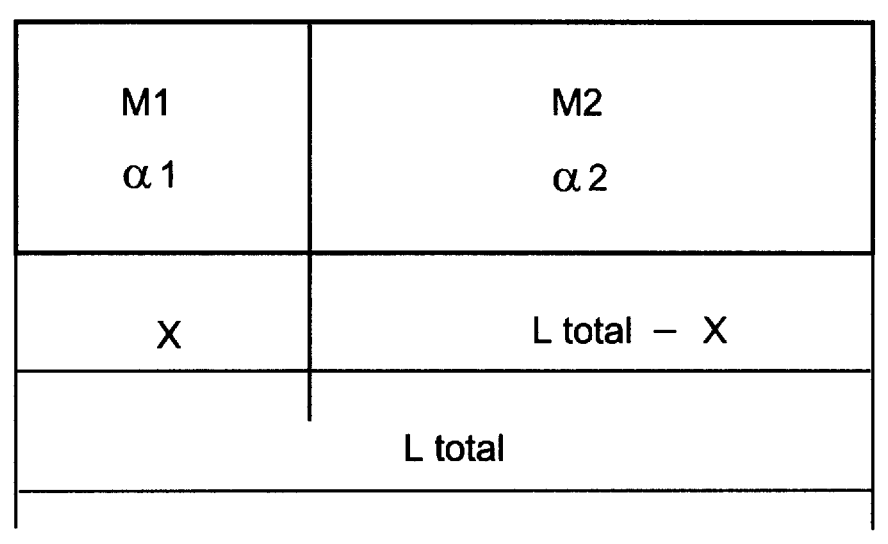

FIG. 13 is a model of the relationship when two different materials 1 and 2 make contact. In the model of FIG. 13, the total length is designated Ltotal, and the length of material 1 is the total length direction is designated x. In this model, the linear thermal expansion coefficient of each material and the weighted mean linear thermal expansion coefficient αM are stipulated by the following relation.

$$\alpha M \cdot L\text{total} = \alpha 1 \cdot x + \alpha 2 \cdot (L\text{total} - x) \tag{1}$$

Equation (1) is applicable to the light source device of the first embodiment. When the value of αM=17.3×$10^{-6}$, the value of Ltotal=15 mm, the value of α1=23×$10^{-6}$ (value for aluminum), and the value of α2=11.7×$10^{-6}$ (value for iron) are substituted in Equation(1) above, the value of x can be determined and the following value derived.

x=7.43 mm

When the focal length of collimator lens 2 in light source device A is 15 mm, it is clear that the value of the weighted mean linear thermal expansion coefficient αM of αM=17.3×$10^{-6}$ allows setting the aluminum material member at 7.43 mm and the iron material member set at 7.57 mm.

In the light source device of the first embodiment described above, the laser support member 101 has a length in the optical axis direction 7.57 mm from the laser emission position because it uses an iron material subjected to a nickel surface process, and first lens barrel support member 102 sets the distance between the placement position of the collimator lens 2 in the axial direction and contact position of the two members at 7.43 mm because it uses an aluminum material.

The layout of the various components in the main scan direction of the first embodiment is determined in the aforesaid manner. The construction in the subscan direction relative to the construction of the aforesaid light source device A is determined as described below.

Figure 14:
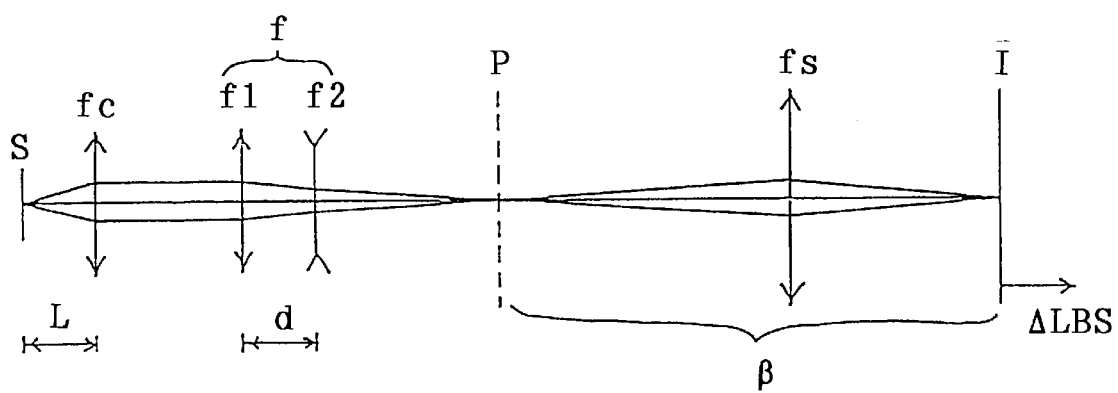
FIG. 14 illustrates the reflective power of the subscan cross section of the laser scanning device of the first embodiment.

FIG. 14 shows the refractive power layout of the cross section in the subscan direction of the laser scanning device of the first embodiment. In the drawing, reference symbol S refers to the light source, fc refers to the focal length of the collimator lens 2, f1 refers to the focal length of the cylindrical lens 4, f2 refers to the focal length of the cylindrical lens 5, f refers to the combined focal length of cylindrical lenses 4 and 5, fs refers to the combined focal length in the subscan direction of scanning lens unit 13 and cylindrical lens 24, P refers to the deflection surface, and I refers to the scanned surface. Reference symbol L refers to the space between the semiconductor laser element and the collimator lens 2, d refers to the spacing of cylindrical lenses 4 and 5, S refers to space from the image side surface of cylindrical lens 5 to the deflection surface, and ΔLBS refers to the error (direction from the light source is designated positive) in the optical axis direction from the scanned surface I of a position of minimum spot diameter in the subscan direction. The magnification rate of the optical unit from deflection surface P to scanned surface I is designated β.

Among the values of the various focal lengths in the subscan direction, the value of fs is determined from the desired spot diameter on the scanned surface and sensitivity relative to correction of planar aberration. In the case of the first embodiment, the value of β is set at −0.73. In the subscan direction, the refractive power of cylindrical lenses 4 and 5 may be determined so as to make adjustment relative to fs with β set at −0.73, and compensate for the change in total focal length in the subscan direction.

In the laser scanning device of the first embodiment, the factors causing fluctuation of spot diameter on the scanned surface relative to change of environmental temperature in the subscan direction include, in addition to spatial fluctuation between the semiconductor laser element 1 and collimator lens 2, (1) fluctuation of axial chromatic aberration of the collimator lens 2 and scanning lenses 7 and 8 due to fluctuation of the oscillation wavelength of the laser light source, (2) fluctuation of refractive power of the collimator lens 2, (3) fluctuation of the refractive power of the scanning lenses 7 and 8, (4) fluctuation of the refractive power of cylindrical lenses 4, 5 and 24, and (5) fluctuation of the axial chromatic aberration of cylindrical lenses 4, 5 and 24 due to fluctuation of the oscillation wavelength of the laser light source.

Figure 15:
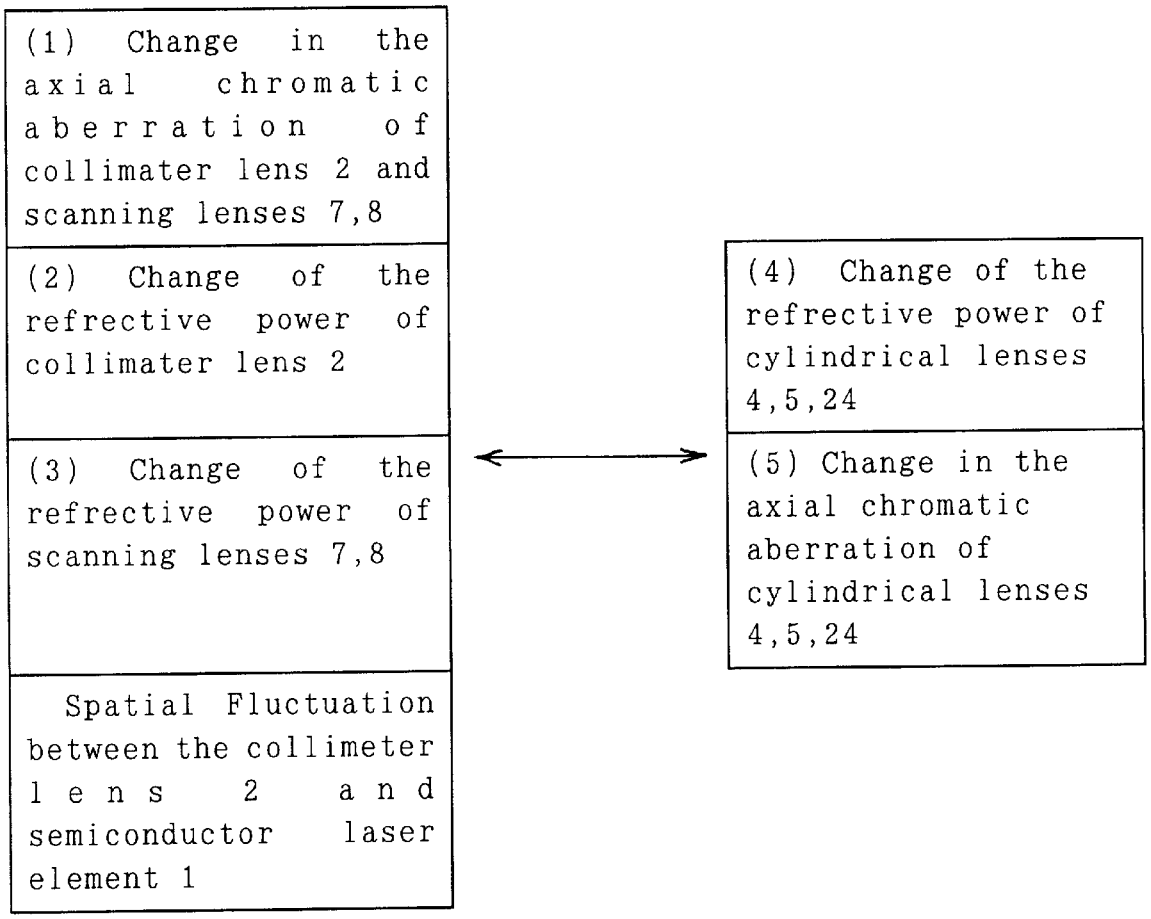
FIG. 15 illustrates temperature compensation of the focal length in the subscan direction of the laser scanning device of the first embodiment.

In realizing the laser scanning device of the first embodiment, the aforesaid six factors in the subscan direction are combined as shown in FIG. 15, i.e., the combined fluctuations of the spatial fluctuation between semiconductor laser element 1 and collimator lens 2 and the fluctuations of factors (1) through (3) are cancelled by factors (4) and (5) via determining the shapes of cylindrical lenses 4 and 5 so as to provide suitable values for factors (4) and (5).

TABLE 5 shows calculations relative to ΔLBS of fluctuation factors (1) through (3) and the spatial fluctuation between semiconductor laser element 1 and collimator lens 2 when the environmental temperature change ΔT is 20° C. with regard to the light source device A determined relative to the main scan direction. Furthermore, ΣΔLBS is the sum of all said calculated fluctuation factors.

The calculation of ΔLBS in TABLE 5 uses the values determined in TABLE 6 relating to the thermal expansion coefficient α of each component and the temperature change rate dn/dT of refraction, and assumes the change in the shape of the lens due to temperature fluctuation as a change which maintains a similar relationship. Accordingly, the radius of curvature of each surface is calculated by multiplying the temperature fluctuation ΔT by the linear thermal coefficient of expansion shown in TABLE 6. Furthermore, the value dλ/dT=0.23 nm/degree is used as the oscillation wavelength change rate dλ/dT induced by temperature change of the semiconductor laser element.

As can be understood from the calculation results shown in TABLE 5, when the environmental temperature fluctuates 20° C. in the refractive power layout of FIG. 14, the position of minimum spot diameter changes in a direction removed from semiconductor laser element 1 by only 1.256 mm in the main scan direction. Therefore, whenever the environmental temperature changes 20° C., temperature compensation can be achieved in the subscan direction by cylindrical lenses 4 and 5 if the refractive power of cylindrical lenses 4 and 5 are designed to about ΔLBS=−1.256 mm.

For example, when cylindrical lens 4 uses BK7 as a glass material of a lens having a positive refractive power and cylindrical lens 5 uses PMMA (resin) as a material of a lens having a negative refractive power, the combination of the refractive powers of cylindrical lenses 4 and 5 having about ΔLBS=−1.256 mm has multiple solutions as shown in TABLE 7.

Among these solutions, when for example f1=30 and f2=−16, ΔLBS calculation results in TABLE 8. The calculation of ΔLBS in TABLE 8 uses the values determined in TABLE 8 relating to the thermal expansion coefficient α of each component and the temperature change rate dn/dT of the refractive index, and assumes the change in the shape of the lens due to temperature fluctuation as a change which maintains a similar relationship. Accordingly, the radius of curvature of each surface is calculated by multiplying the temperature fluctuation ΔT by the linear thermal coefficient of expansion shown in TABLE 6. Furthermore, the value dλ/dT=0.23 nm/degree is used as the oscillation wavelength change rate dλ/dT induced by temperature change of the semiconductor laser element.

Thus, a value of ΣΔLBS=−1.234 is obtained. In the subscan direction, this value and the value ΣΔLBS=−1.256 determined by TABLE 3 cancel one another, such that the total ΣΔLBS when the environmental temperature fluctuates 20° C. is an extremely small value as shown below.

$$\Sigma_\Delta LBS(\text{total}) = 1.256 + (-1.234)$$
$$= 0.022 \text{ mm}$$

According to this line of reasoning, it is possible to realize a laser scanning device wherein the total focal length of the optical unit does not change regardless of environmental temperature fluctuation.

A second embodiment of the present invention is described below.

Figure 16:
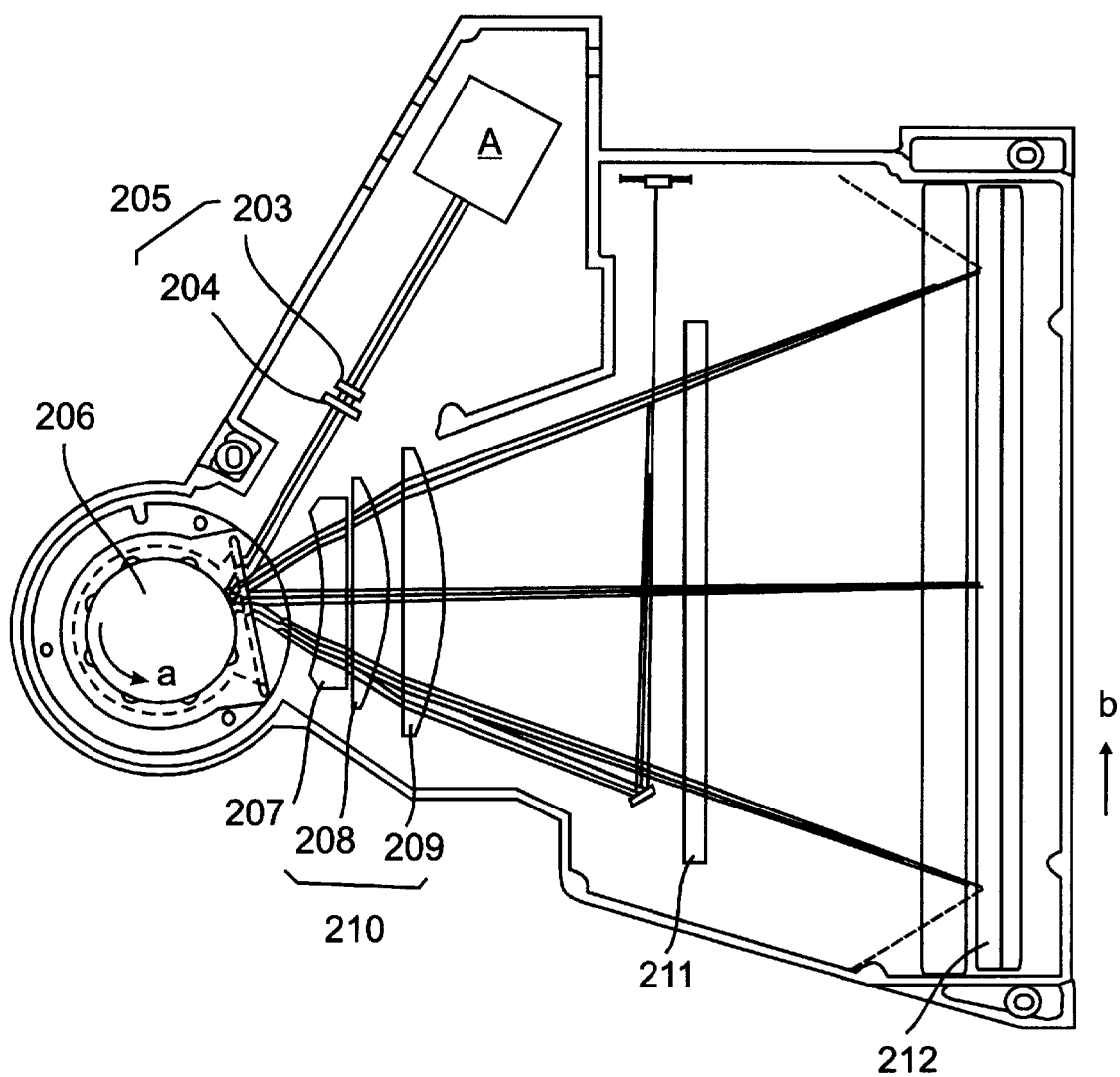
FIG. 16 is a top view of the light source device of the laser scanning device of a second embodiment.
Figure 17:
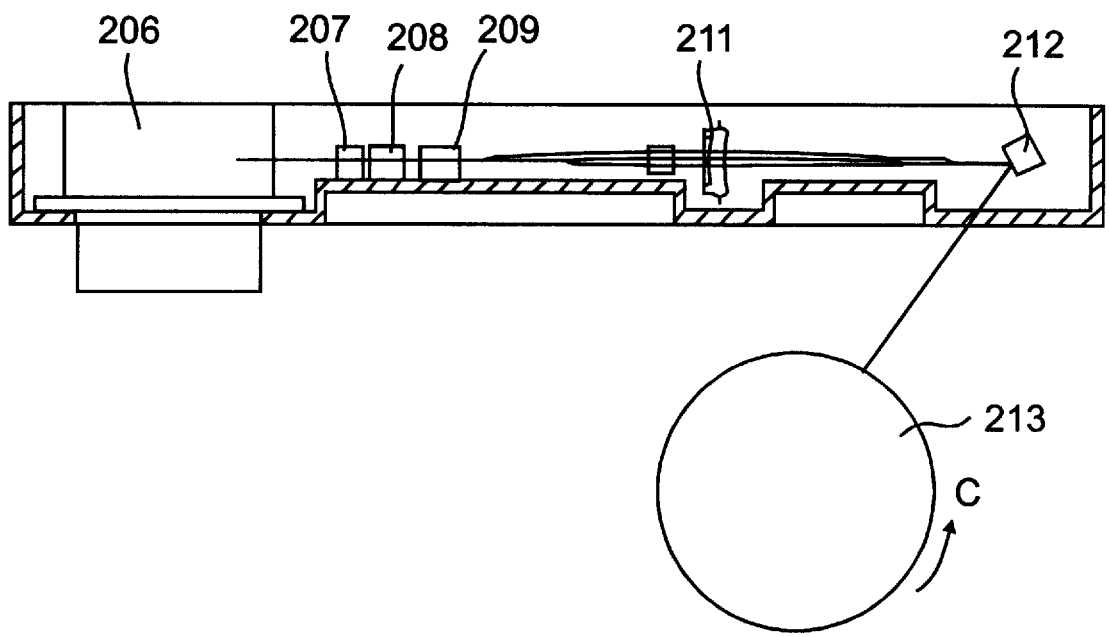
FIG. 17 is a side view of the light source device of a laser scanning device of the second embodiment.

FIG. 16 is a top view of the laser scanning device of a second embodiment, and FIG. 17 is a front view of the laser scanning device of the second embodiment. The laser scanning device of the second embodiment comprises an internal light source device A having a construction identical to that of the light source device A of the first embodiment which supports a collimator lens and a semiconductor laser element 201 that emits a laser beam, cylindrical lens unit 205 provided with a cylindrical lens 203 having positive refractive power only in the subscan direction and a cylindrical lens 204 having a negative refractive power only in the subscan direction and formed of a plastic material, scanning lens unit 210 provided with a polygonal mirror 6, scanning lens 207 having a negative refractive power, scanning lens 208 having a positive refractive power, and scanning lens 209 having a positive refractive power, free curvature lens 211 having a positive refractive power only in the subscan direction and formed of a plastic material, mirror 212, and a photosensitive drum 213 as a scanned surface.

The laser scanning device of the second embodiment, similar to the laser scanning device of the first embodiment, deflects a laser beam emitted from light source device A by polygonal mirror 206, so as to scan the surface of photosensitive drum 213. Points of departure of the laser scanning device of the second embodiment relative to the first embodiment include (1) a single light source device A; (2) the emission position of the semiconductor laser element is shifted slightly from the focus position of the collimator lens so as to emit converging light from the collimator lens; (3) the scanning lens unit 210 comprises three lenses; and (4) the cylindrical lens 211 arranged on the side of photosensitive drum 213 is a free curvature lens defining an extended toric surface which does not have refractive power in the subscan direction.

TABLE 9 contains construction data showing numerical examples of the second embodiment.

In the TABLE 9, riy (where i=1, 2, 3 . . . ) represents the radius of curvature in the main scan direction of a No. i surface counting from the light source side; riz (where i=1, 2, 3 . . . ) represents the radius of curvature in the subscan direction of the No. i surface counting from the light source side; di (where i=1, 2, 3 . . . ) represents the axial distance of No. i surface counting from the light source side; and Ni (where i=1, 2, 3) represents the reflective index relative to light rays of 780 nm wavelength of the No. i lens counting from the light source side. 10 The value r4 (image side surface of collimator lens) having an asterisk (*) appended to the radius of curvature is an axially symmetric aspherical surface expressed by the equation below.

$$X = \frac{c \cdot y^2}{1 + \sqrt{1 - \epsilon \cdot c^2 \cdot y^2}} + \sum_{i=2} Ai \cdot y^i$$

wherein X is a displacement amount from a reference surface along the optical axis, Y is a height in a direction vertical to the optical axis, C is a paraxial curvature, $\epsilon$ is a conic constant, and Ai is an ith-order aspherical coefficient. The values of the aspherical surface coefficient of r4 are shown in TABLE 10.

The values r5 and r8 to which an S is appended to the radius of curvature express a cylindrical surface having refractive power only in the subscan direction.

The value r20 which has a positive symbol (+) appended to the radius of curvature is defined by the general equation for an expanded toric surface shown below. This equation defines the three-dimensional spatial coordinates (x: optical axis direction; y: main scan direction; z: subscan direction).

$$X = \frac{\kappa \cdot y^2}{1 + \sqrt{1 - \mu \cdot \kappa^2 \cdot y^2}} + \rho + A$$

$$\kappa = \frac{K}{1 - K \cdot \rho}$$

$$\rho = \frac{c \cdot z^2}{1 + \sqrt{1 - \epsilon \cdot c^2 \cdot z^2}}$$

$$A = \sum_{i=0}^{16} \left( \sum_{j=0}^{8} a_{i,j} \cdot |y|^j \right) \cdot |z|^i$$

$$a_{o,o} \equiv a_{i,1} \equiv a_{1,j} \equiv 0$$

The expanded toric surface is obtained by adding a two-dimensional addition A (y,z) to a standard toric surface. When the curve in the main scan cross section is designated the main curve and the curve in the subscan cross section is designated the profile curve, values K and c respectively express the curvature in the main curve direction and profile curve direction (precisely, K+2$a_{0,2}$ and c+2$a_{2,0}$), and values $\mu$ and $\epsilon$ are the two dimensional parameters of the main curve direction and profile curve direction, respectively. The values of these parameters are shown in TABLE 11.

The free curvature lens 211 differs from a normal cylindrical lens and has a symmetrical axis in the main scan direction. In the laser scanning device of the second embodiment, the symmetrical axis of the free curvature lens 211 is shifted 150 mm toward the main scan direction side from the optical axis of the scanning lens unit 210. By means of this arrangement, the asymmetric characteristics on the upstream side and downstream side in the scanning direction of the curvature of field generated by scanning lens unit 210 can be corrected.

Simulation results when the laser scanning device of the second embodiment shown in TABLE 9 is subjected to a change in environmental temperature from 20° C. to 40° C. is shown in TABLE 12. The positions of the minimum spot diameter in the main scan direction and the subscan direction are expressed in millimeters (m) units as a reference of the scanned surface.

Figure 18:
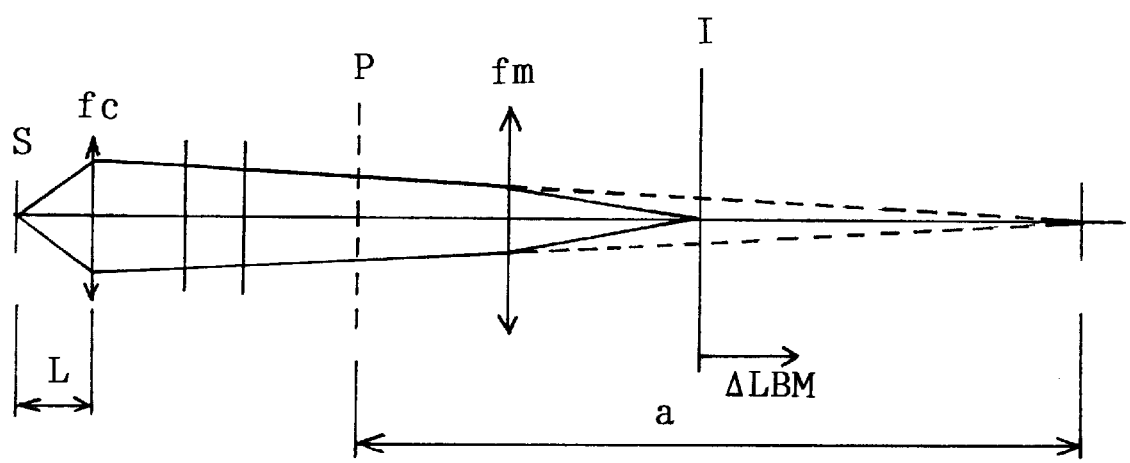
FIG. 18 illustrates the reflective power of the main scan cross section of the laser scanning device of the second embodiment.

FIG. 18 shows the layout of refractive power of the main scan direction cross section of the laser scanning device of the second embodiment. In the drawing, reference symbol S refers to a light source, fc refers to the focal length of the collimator lens, fm refers to the focal length of the scanning lens unit 210 in the main scan direction, P refers to the deflection surface, and I refers to the scanned surface. The layout of refractive power of these components is determined from the desired image characteristics of the scanned surface. Reference symbol L refers to the distance between the semiconductor laser element and the collimator lens, a refers to the distance from deflection surface P to a hypothetical image point position formed on the collimator lens, and ΔLBM expresses the error in the optical axis direction from the scanned surface I of the position of minimum spot diameter in the main scan direction (the direction from the light source being positive).

In the laser scanning device of the second embodiment, the factors causing fluctuation of spot diameter on the scanned surface relative to change of environmental temperature in the main scan direction include, in addition to spatial fluctuation between the semiconductor laser element and collimator lens, (1) fluctuation of axial chromatic aberration of the collimator lens and scanning lenses 207, 208, and 209 due to fluctuation of the oscillation wavelength of the laser light source, (2) fluctuation of refractive power of the collimator lens, and (3) fluctuation of the refractive power of the scanning lenses 207, 208, and 209.

Figure 19:
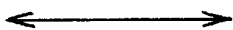
FIG. 19 illustrates temperature compensation of the focal length in the main scan direction of the laser scanning device of the second embodiment.

In realizing the laser scanning device of the second embodiment, the aforesaid four factors in the main scan direction are combined as shown in FIG. 19, i.e., the combined fluctuations of the factors (1) through (3) are cancelled by the spatial fluctuation between semiconductor laser element and the collimator lens.

TABLE 13 shows calculations relative to ΔLBM of fluctuation factors (1) through (3) when the environmental temperature change ΔT is 20° C. using a collimator lens having a focal length fcof 15 mm. Furthermore, ΣΔLBM is the sum of all said calculated fluctuation factors (1) through (3).

The calculation of ΔLBM in TABLE 13 uses the values determined in TABLE 15 relating to the thermal expansion coefficient α of each component and the temperature change rate dn/dT of refraction, and assumes the change in the shape of the lens due to temperature fluctuation as a change which maintains a similar relationship. Accordingly, the radius of curvature of each surface is calculated by multiplying the temperature fluctuation ΔT by the linear thermal coefficient of expansion shown in TABLE 14. Furthermore, the value dλ/dT=0.23 nm/degree is used as the oscillation wavelength change rate dλ/dT induced by temperature change of the semiconductor laser element.

As can be understood from the calculation results shown in TABLE 13, when the environmental temperature fluctuates 20° C. in the refractive power layout of FIG. 18, the position of minimum spot diameter changes in a direction removed from the semiconductor laser element by only 1.9137 mm in the main scan direction. Therefore, whenever the environmental temperature changes 20° C., temperature compensation can be achieved in the main scan direction if light source device A is designed such that the spatial fluctuation of the semiconductor laser element and the collimator lens about ΔLBM=−1.9137 mm.

In the second embodiment, calculations are performed in the same manner as in the first embodiment by determining the weighted mean linear thermal expansion coefficient αM as shown below. αM=16.75×10⁻⁸

When x is determined relative to light source device A of the second embodiment by substituting the aforesaid value in Equation (1), the following value is derived.

x=7.37 mm

Accordingly, when the space between the semiconductor laser element and the collimator lens is 16.5 mm in the light source device A of the second embodiment and the value of the weighted mean linear thermal expansion coefficient αM is set at αM=16.75×10⁻⁸, the member of aluminum material may be set at 7.37 mm and the member of iron material may be set at 9.13 mm.

In the light source device A of the second embodiment described above, the laser support member 101 has a length in the optical axis direction 9.13 mm from the laser emission position because it uses an iron material subjected to a nickel surface process, and first lens barrel support member 102 sets the distance between the placement position of the collimator lens in the axial direction and contact position of the two members at 7.37 mm because it uses an aluminum material.

The layout of the various components in the main scan direction of the second embodiment is determined in the manner described above. Then the construction in the subscan direction is determined for the aforesaid light source device A.

Figure 20:
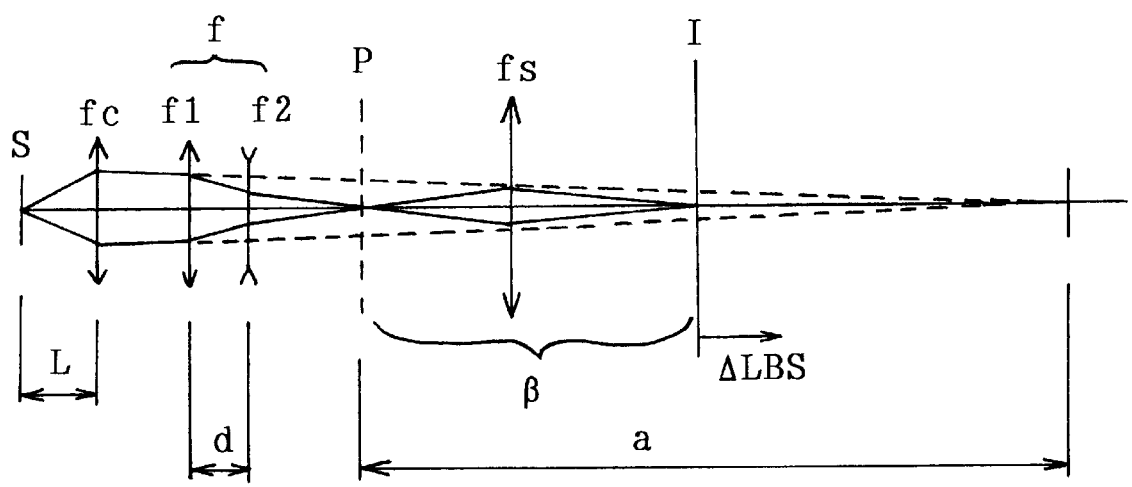
FIG. 20 illustrates the reflective power of the subscan cross section of the laser scanning device of the second embodiment.

FIG. 20 shows the layout of refractive power of the subscan direction cross section of the laser scanning device of the second embodiment. In the drawing, reference symbol S refers to a light source, fc refers to the focal length of the collimator lens, f1 refers to the focal length of cylindrical lens 203, f2 refers to the focal length of cylindrical lens 204, f refers to the combined focal lengths of cylindrical lenses 203 and 204, fs refers to the combined focal lengths of scanning lens unit 210 and cylindrical lens 211 in the subscan direction, P refers to the deflection surface, and I refers to the scanned surface. Reference symbol L refers to the distance between the semiconductor laser element 1 and the collimator lens, d refers to the spacing of cylindrical lenses 203 and 204, S refers spacing from the image side surface of cylindrical lens 204 to the deflection surface, a refers to the distance from deflection surface P to a hypothetical image point position formed on the collimator lens, and ΔLBS expresses the error in the optical axis direction from the scanned surface I of the position of minimum spot diameter in the subscan direction (the direction from the light source being positive).

Among the values of the various focal lengths in the subscan direction, the value of fs is determined from the desired spot diameter on the scanned surface and photosensitivity relative to correction of planar aberration. In the case of the second embodiment and similar to the first embodiment, the refractive power of cylindrical lenses 203 and 204 in the subscan direction may be determined so as to make adjustment relative to fs and compensate for the change in total focal length in the subscan direction.

In the laser scanning device of the second embodiment, the factors causing fluctuation of spot diameter on the scanned surface relative to change of environmental temperature in the subscan direction include, in addition to spatial fluctuation between the semiconductor laser element and collimator lens, (1) fluctuation of axial chromatic aberration of the collimator lens and scanning lenses 207, 208, and 209 due to fluctuation of the oscillation wavelength of the laser light source, (2) fluctuation of refractive power of the collimator lens, (3) fluctuation of the refractive power of the scanning lenses 207, 208, and 209, (4) fluctuation of the refractive power of cylindrical lenses 203, 204 and 211, and (5) fluctuation of the axial chromatic aberration of cylindrical lenses 203, 204 and 211 due to fluctuation of the oscillation wavelength of the laser light source.

Figure 21:
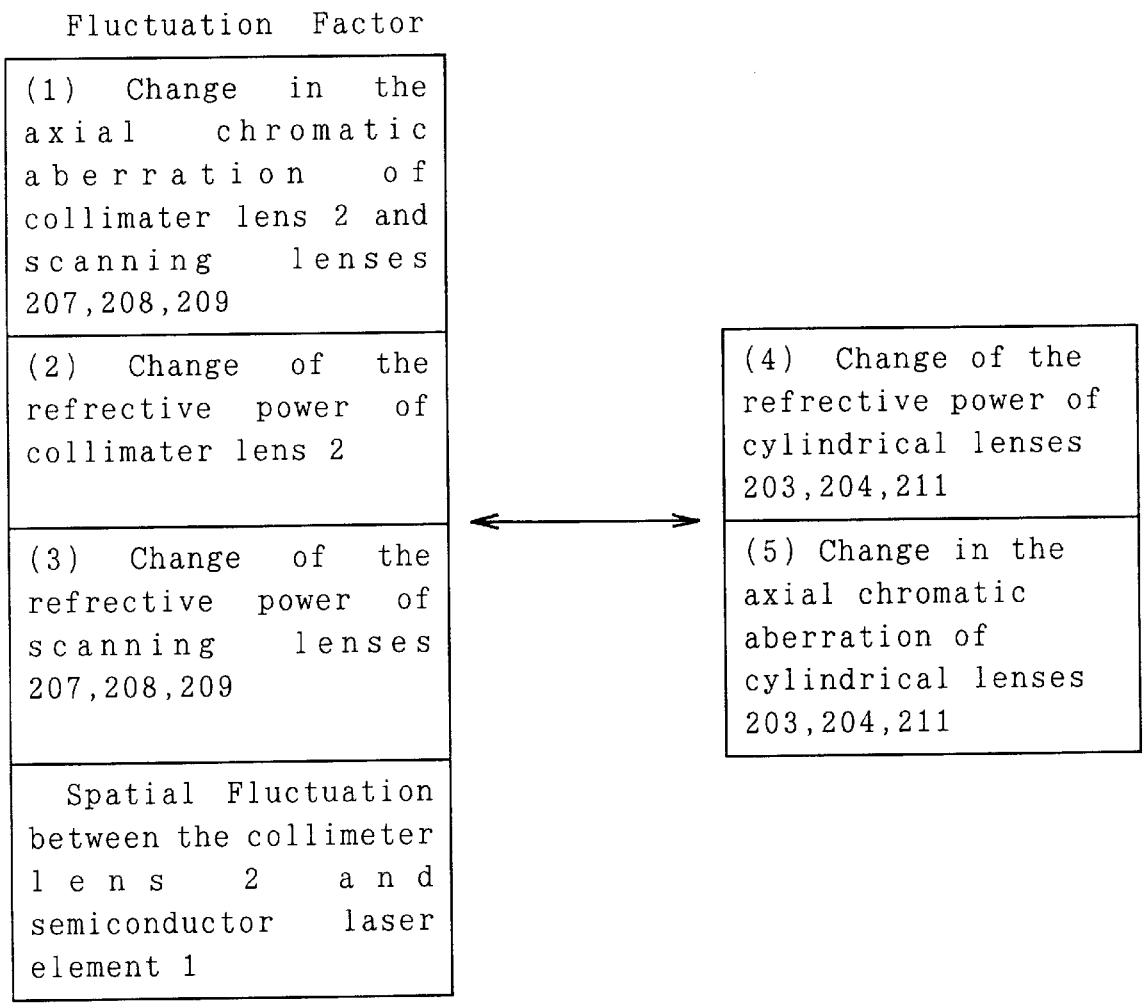
FIG. 21 illustrates temperature compensation of the focal length in the subscan direction of the laser scanning device of the second embodiment.

In realizing the laser scanning device of the second embodiment, the aforesaid six factors in the subscan direction are combined as shown in FIG. 21, i.e., the combined fluctuations of the spatial fluctuation between semiconductor laser element 1 and collimator lens and the fluctuations of factors (1) through (3) are cancelled by factors (4) and (5) via determining the shapes of cylindrical lenses 203 and 204 so as to provide suitable values for factors (4) and (5).

TABLE 15 shows calculations relative to ALBS of fluctuation factors (1) through (3) and the spatial fluctuation between semiconductor laser element 1 and collimator lens when the environmental temperature change ΔT is 20° C. with regard to the light source device A determined relative to the main scan direction. Furthermore, ΣΔLBS is the sum of all said calculated fluctuation factors.

The calculation of ΔLBS in TABLE 15 uses the values determined in TABLE 16 relating to the thermal expansion coefficient α of each component and the temperature change rate dn/dT of refraction, and assumes the change in the shape of the lens due to temperature fluctuation as a change which maintains a similar relationship. Accordingly, the radius of curvature of each surface is calculated by multiplying the temperature fluctuation ΔT by the linear thermal coefficient of expansion shown in TABLE 14. Furthermore, the value dλ/dT=0.23 nm/degree is used as the oscillation wavelength change rate dλ/dT induced by temperature change of the semiconductor laser element.

As can be understood from the calculation results shown in TABLE 15, when the environmental temperature fluctuates 20° C. in the refractive power layout of FIG. 18, the position of minimum spot diameter changes in a direction removed from the semiconductor laser element by only 2.5633 mm in the subscan direction. Therefore, whenever the environmental temperature changes 20° C., temperature compensation can be achieved in the subscan direction via cylindrical lenses 203 and 204 if the reflective power of cylindrical lenses 203 and 204 is such that about ΔLBS=−2.5633 mm.

For example, when cylindrical lens 204 uses BK7 as a glass material of a lens having a positive refractive power and cylindrical lens 203 uses amorphous polyolefin (resin) as a material of a lens having a negative reflective power, the value of fs is adjusted and the combination of the refractive powers of cylindrical lenses 203 and 204 having about ΔLBS=−2.5633 mm has multiple solutions as shown in TABLE 17.

Among these solutions, when for example f1=30 and f2=−30, ΔLBS calculation results in TABLE 19. The calculation of ΔLBS in TABLE 19 uses the values determined in TABLE 16 relating to the thermal expansion coefficient α of each component and the temperature change rate dn/dT of the refractive index, and assumes the change in the shape of the lens due to temperature fluctuation as a change which maintains a similar relationship. Accordingly, the radius of curvature of each surface is calculated by multiplying the temperature fluctuation ΔT by the linear thermal coefficient of expansion shown in TABLE 16. Furthermore, the value dλ/dT=0.23 nm/degree is used as the oscillation wavelength change rate dλ/dT induced by temperature change of the semiconductor laser element.

Thus, a value of ΣΔLBS=−2.5613 is obtained. In the subscan direction, this value and the value ΣΔLBS=−2.5633 determined by TABLE 15 cancel one another, such that the total ΣΔLBS when the environmental temperature fluctuates 20° C. is an extremely small value as shown below.

$$\Sigma_\Delta LBS(\text{total}) = 2.563 + (-2.5613)$$
$$= 0.020 \text{ mm}$$

According to this line of reasoning, it is possible to realize a laser scanning device wherein the total focal length of the optical unit does not change regardless of environmental temperature fluctuation even in the second embodiment.

Figure 22:
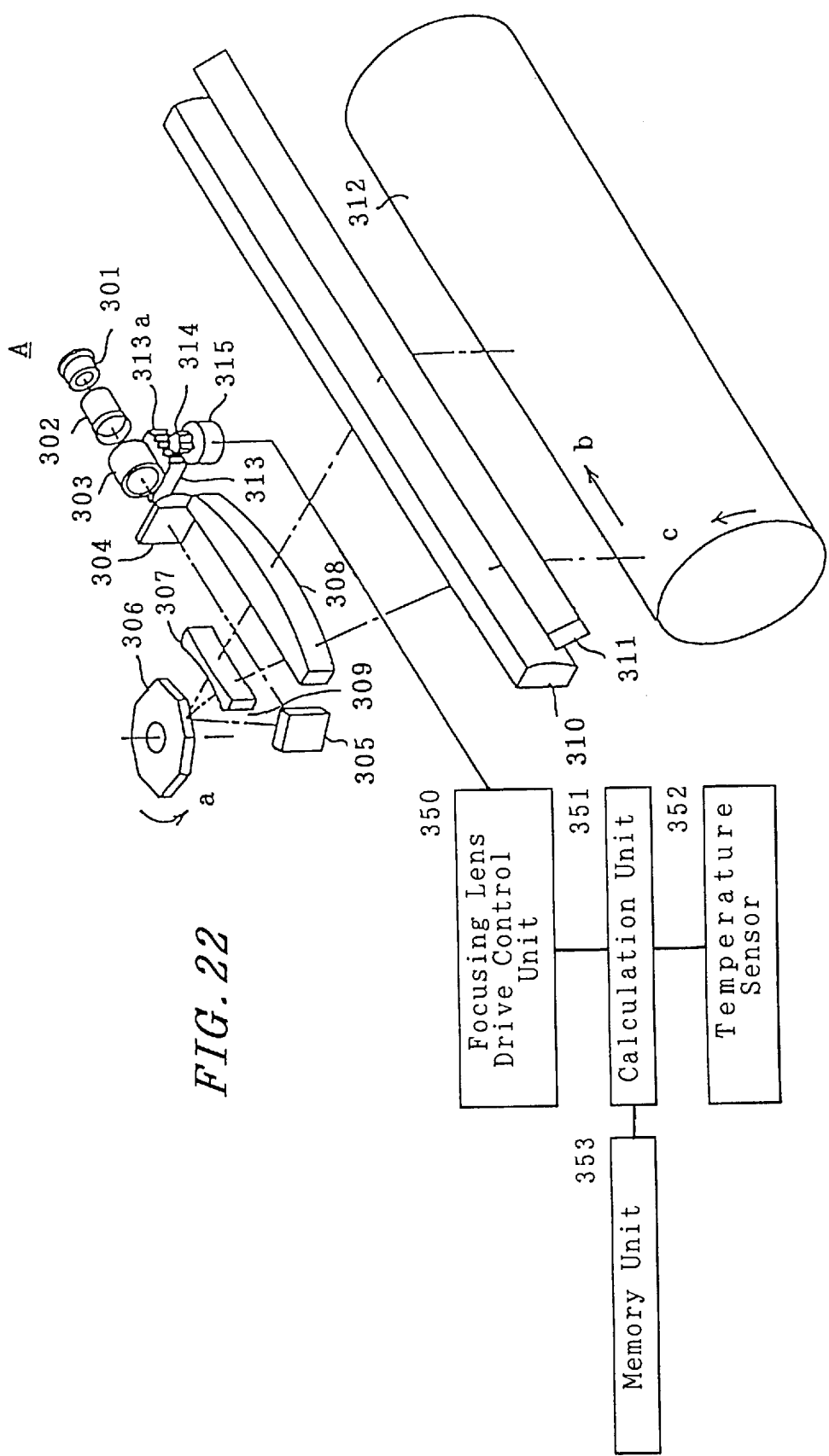
FIG. 22 is a perspective view of the optical unit of a laser scanning device of a third embodiment of the present invention.
Figure 23:
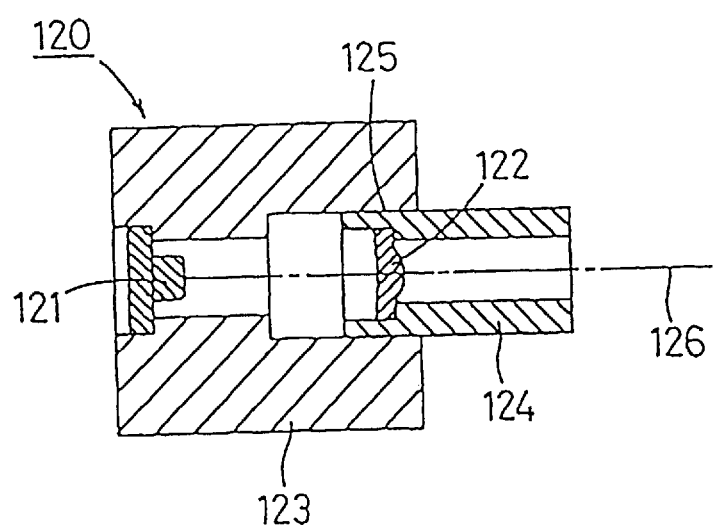
FIG. 23 briefly shows the construction of a conventional light source device.

A third embodiment of the present invention is described below with reference to FIG. 22. FIG. 22 is a perspective view showing the construction of the optical system of a laser scanning device of the third embodiment.

The laser scanning device of the third embodiment comprises a semiconductor laser element 301 that emits a laser beam, lens barrel 302 for supporting a collimator lens (not illustrated) in its interior, cylindrical lens 304 having positive reflective power only in the subscan direction, focusing lens 303, folding mirror 305, polygonal mirror 306 identical to the mirror of the first embodiment, a scanning lens unit 309 identical to that of the first embodiment provided with a scanning lens 307 having a negative refractive power and scanning lens 308 having a positive refractive power, cylindrical lens 310 having a positive refractive power only in the subscan direction, mirror 311, and a photosensitive drum 312 as a scanned surface. Semiconductor laser element 301 and lens barrel 302 are supported by a light source device A identical to the light source device A of the first embodiment.

The focusing lens 303 is mounted on a base plate 313 which is movable in the direction of the optical axis. A rack 313a is formed on the side surface of said base plate 313, and engages a pinion gear 314 provided on the shaft of a stepping motor 315. When stepping motor 315 rotates, the pinion gear 314 is rotated and the focusing lens 303 is moved in the optical axis direction via rack 313a.

Stepping motor 315 is connected to the focusing lens drive control unit 350. The focusing lens drive control unit 350 is controlled by control signals from a calculation unit 351, and outputs drive pulses to stepping motor 315 based on the signals output by calculation unit 351. Connected to calculation unit 351 are a memory unit 353 for storing the amount of movement of focusing motor 303 when there is a change in the voltage value corresponding to a set voltage, and a temperature sensor 352 which outputs a voltage signal in accordance with the temperature.

In the aforesaid construction, after the laser light emitted from semiconductor laser element 301 are rendered parallel by the collimator lens supported in lens barrel 302 and focusing lens 303, said laser light is linear in form and has a length in the main scan direction on the deflection surface of polygonal mirror 306 via the action of cylindrical lens 304 relative to the subscan direction.

The laser beam condensed in the subscan direction in the vicinity of the deflection surface of polygonal mirror 306 via cylindrical lens 304 is deflected in the main scan direction (arrow b direction) via the rotation of the deflection surface of polygonal mirror 306 in the arrow a direction in the drawing. The laser beam deflected by the deflection surface of polygonal mirror 306 is condensed in the main scan direction via scanning lens unit 309. The laser beam is condensed in the subscan direction via cylindrical lens 310 having a positive power in the subscan direction and disposed medially to scanning lens unit 309 and photosensitive drum 312.

Thus, the laser beam forms an image on the surface of photosensitive drum 312, and scans in the main scan direction via the rotation of polygonal mirror 306. Scanning in the subscan direction is accomplished via the rotation of photosensitive drum 312 in the arrow c direction.

Calculation unit 351 fetches the voltage output corresponding to the temperature from the temperature sensor with a predetermined timing. Calculation unit 351 compares this detected voltage to a voltage value of a set temperature stored in memory unit 335. As a result of said comparison, if the temperature has fluctuated, calculation unit 351 fetches the movement amount of the focusing lens 303 stored in memory unit 35, and outputs said data to focusing lens 303 drive control unit 350.

Focusing lens drive control unit 350 generates pulses corresponding to the amount of movement of the focusing lens 303 to rotate the stepping motor 315. As a result, the focusing lens 303 is moved in the optical axis direction in accordance with the change in temperature, thereby correcting the total focal length.

This focusing correction may be accomplished with a timing either for each single scan line or for each predetermined number of scan lines. If the rack 313a and pinion gear 314 are exceptionally small, focusing correction can be accomplished during image formation.

In the third embodiment as described above, the total focal length can be corrected by moving the focusing lens 303 in the optical axis direction regardless of the change in temperature. Thus, the amount of correction movement of focusing lens 303 relative to temperature change can be stored beforehand in the memory unit, thereby allowing prediction of the change of focal length of the light source device of the second embodiment relative to temperature change.

That is, in the third embodiment, focusing correction is readily accomplished because the change in focal length of the light source device is excellent reproducibility.

As previously described, in the laser scanning system of the first through third embodiments, because the light source device is constructed such that the lens barrel and lens barrel support member made of identical type materials are joined at an interior surface parallel to the optical axis of the collimator lens, and the lens barrel support member and laser support member made of different type materials are joined at an interior surface perpendicular to the optical axis of the collimator lens, slippage and shifting does not occur in the optical axis direction of the collimator lens due to different linear thermal expansion coefficients at the joining surfaces between the different types of materials when said members are subjected to thermal expansion. Accordingly, the distance between the light source and the collimator lens changes with excellent reproducibility in accordance with changes in temperature, and because the change in total focal length of the optical system can be precisely predicted, the change in focal length can be precisely corrected.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

TABLE 1

| i | Radius of Curvature in Main scan Direction riy | Radius of Curvature in subscan Direction riz | Axial Distance di | refractive Index Ni |
|---|---|---|---|---|
| 1 | ∞ | 12.780 | 3.000 | 1.51118 |
| 2 | ∞ | ∞ | 12.783 | |
| 3 | ∞ | ∞ | 2.200 | 1.48457 |
| 4 | ∞ | 4.846 | 70.002 | |
| 5(deflection surface) | | | 33.000 | |
| 6 | −254.411 | −254.411 | 7.000 | 1.51118 |
| 7 | 1098.901 | 1098.901 | 30.000 | |
| 8 | ∞ | ∞ | 15.000 | 1.82389 |
| 9 | −147.454 | −147.454 | 163.844 | |
| 10 | ∞ | 44.590 | 5.000 | 1.48457 |
| 11 | ∞ | ∞ | 131.039 | |
| 12(scanned surface) | | | | |

TABLE 2

| | Position of Minimum Spot Diamiter (Before variation) wavelength: 780.0 nm Variation of objective distance: 0.000 mm temperature: 20° C. | Position of Minimum Spot Diameter (After variation) wavelength: 784.6 nm Variation of objective distance: −0.00469 mm temperature: 40° C. | Variation |
|---|---|---|---|
| Main Scan Direction | 0.115 | 0.227 | 0.112 |
| Subscan Direction | −0.033 | −0.061 | −0.028 |

TABLE 3

| | ΔLEM(mm) | ΣΔLEM(mm) |
|---|---|---|
| (1) Change in the axial chromatic aberration of collimater lens 2 and scanning lenses 7, 8 | 1.999 | 1.665 |
| (2) Change of the refrective power of collimater lens 2 | −0.288 | |
| (3) Change of the refrective power of scanning lenses 7, 8 | −0.045 | |

TABLE 4

| Material | Linear Thermal Coefficient of Expantion α(mm/degree) | Temperature Change Rate of refractive index dn/dT(1/degree) |
|---|---|---|
| SF57 (Glass) (collimeter lens 2 and scanning lens 8) | $79 \times 10^{-7}$ | $0.26 \times 10^{-5}$ |
| BK7 (Glass) (scanning lens 7) | $78 \times 10^{-7}$ | $0.95 \times 10^{-5}$ |

TABLE 5

| | ΔLBS(mm) | ΣΔLBS(mm) |
|---|---|---|
| (1) Change in the axial chromatic aberration of collimater lens 2 and scanning lenses 7, 8 | 0.671 | 1.256 |
| (2) Change of the refrective power of collimater lens 2 | −0.084 | |
| (3) Change of the refective power of scanning lenses 7, 8 | 1.146 | |

TABLE 5-continued

| | ΔLBS(mm) | ΣΔLBS(mm) |
|---|---|---|
| Spatial Fluctuation between the collimeter lens 2 and semiconductor laser element 1 | −0.477 | |

TABLE 6

| Material | Linear Thermal Coefficient of Expantion α(mm/degree) | Temperature Change Rate of refractive index dn/dT(1/degree) |
|---|---|---|
| SF57 (Glass) (collimeter lens 2 and scanning lens 8) | $79 \times 10^{-7}$ | $0.26 \times 10^{-5}$ |
| BK7 (Glass) (scanning lens 7 and cylindrical lens 4) | $78 \times 10^{-7}$ | $0.95 \times 10^{-5}$ |
| PMMA (rasin) (cylindrical lenses 5, 24) | $700 \times 10^{-7}$ | $-1.07 \times 10^{-4}$ |

TABLE 7

| f1 (mm) | f2 (mm) | d (mm) | S (mm) |
|---|---|---|---|
| 25 | −10 | 12.8 | 70.8 |
| 30 | −16 | 12.9 | 91.5 |
| 35 | −25 | 10.9 | 118.7 |
| 40 | −35 | 8.5 | 140.8 |
| 45 | −45 | 6.6 | 155.8 |
| 50 | −60 | 1.5 | 180.9 |

TABLE 8

| | ΔLBS(mm) | ΣΔLBS(mm) |
|---|---|---|
| (4) Change of the refrective power of cylindrical lenses 4, 5, 24 | −1.270 | −1.234 |
| (5) Change in the axial chromatic aberration of cylindrical lenses 4, 5, 24 | 0.036 | |

TABLE 9

| i | Radius of Curvature in Main scan Direction riy | Radius of Curvature in subscan Direction riz | Axial Distance di | refractive Index Ni |
|---|---|---|---|---|
| 1 | ∞ | ∞ | 5.45 | 1.51118 |
| 2 | ∞ | ∞ | 10.36 | |
| 3 | −158.756 | −158.756 | 2.50 | 1.82489 |
| 4* | −12.625 | −12.625 | 49.01 | |
| 5S | ∞ | 15.335 | 3.00 | 1.51118 |
| 6 | ∞ | ∞ | 4.07 | |
| 7 | ∞ | ∞ | 2.20 | 1.51882 |
| 8S | ∞ | 15.565 | 66.92 | |
| 9 | ∞ | ∞ | 2.00 | 1.51118 |
| 10 | ∞ | ∞ | 8.00 | |
| 11(deflection surface) | | | 5.00 | |
| 12 | ∞ | ∞ | 2.00 | 1.51118 |
| 13 | ∞ | ∞ | 26.00 | |
| 14 | −103.692 | −103.692 | 9.15 | 1.82489 |
| 15 | ∞ | ∞ | 2.00 | |
| 16 | ∞ | ∞ | 12.93 | 1.51118 |
| 17 | −93.325 | −93.325 | 5.22 | |
| 18 | 987.908 | 987.908 | 15.00 | 1.51118 |

TABLE 9-continued

| i | Radius of Curvature in Main scan Direction riy | Radius of Curvature in subscan Direction riz | Axial Distance di | refractive Index Ni |
|---|---|---|---|---|
| 19 | −140.872 | −140.872 | 90.70 | |
| 20+ | ∞ | ∞ | 7.00 | 1.51882 |
| 21 | ∞ | ∞ | 25.00 | |
| 22 | ∞ | ∞ | 2.00 | 1.51118 |
| 23 | ∞ | ∞ | 168.00 | |
| 24(scanned surface) | | | | |

TABLE 10

Aspherical Data of Aspherical Surface r4*

| | |
|---|---|
| $\epsilon =$ | 1.00000 |
| A4 = | $0.32063517 \times 10^{-4}$ |
| A6 = | $0.16507685 \times 10^{-6}$ |
| A8 = | $0.72666582 \times 10^{-9}$ |
| A10 = | $0.43489896 \times 10^{-11}$ |

TABLE 11

Aspherical Data of Expanded Toric Surface r20+

| | $\epsilon = 1.00000$ | $1/c = \infty$ |
|---|---|---|
| Ai, j | $\mu = 1.00000$ | $1/K = \infty$ |
| | i = 0 | i = 2 |
| j = 0 | | $0.72252849 \times 10^{-2}$ |
| j = 2 | 0.0000000 | $0.35899343 \times 10^{-6}$ |
| j = 3 | $-0.28553171 \times 10^{-5}$ | 0.00000000 |
| j = 4 | $0.39519856 \times 10^{-7}$ | $-0.21322561 \times 10^{-10}$ |
| j = 5 | 0.31113506 | 0.00000000 |
| j = 6 | $-0.93170763 \times 10^{-11}$ | $0.92404715 \times 10^{-15}$ |
| j = 7 | $0.76062437 \times 10^{-13}$ | 0.00000000 |
| j = 8 | $-0.30715986 \times 10^{-15}$ | $-0.33573125 \times 10^{-19}$ |
| j = 9 | $0.63442733 \times 10^{-18}$ | 0.00000000 |
| j = 10 | $-0.53836434 \times 10^{-21}$ | $0.85731910 \times 10^{-24}$ |
| j = 12 | | $-0.13709605 \times 10^{-28}$ |
| j = 14 | | $0.12245854 \times 10^{-33}$ |
| j = 16 | | $-0.46544594 \times 10^{-39}$ |

TABLE 12

| | Position of Minimum Spot Diamiter (Before variation) wavelength: 780.0 nm Variation of objective distance: 0.000 mm temperature: 20° C. | Position of Minimum Spot Diameter (After variation) wavelength: 784.6 nm Variation of objective distance: −0.00552 mm temperature: 40° C. | Variation |
|---|---|---|---|
| Main Scan Direction | 0.1690 | 0.0910 | −0.078 |
| Subscan Direction | 0.1228 | 0.0248 | −0.098 |

TABLE 13

| | ΔLEM (mm) | ΣΔLEM (mm) |
|---|---|---|
| (1) Change in the axial chromatic aberration of collimater lens 2 and scanning lenses 207, 208, 209 | 2.2215 | 1.9137 |
| (2) Change of the refractive power of collimater lens 2 | −0.3728 | |

TABLE 13-continued

| | ΔLEM (mm) | ΣΔLEM (mm) |
|---|---|---|
| (3) Change of the refractive power of scanning lenses 207, 208, 209 | −0.0650 | |

TABLE 14

| Material | Linear Thermal Coefficient of Expantion α (mm/degree) | Temparture Change Rate of refractive index dn/dT (1/degree) |
|---|---|---|
| SF57 (Glass) (collimeter lens 2 and scanning lens 207) | $79 \times 10^{-7}$ | $0.26 \times 10^{-5}$ |
| BK7 (Glass) (scanning lens 208, 209 and cover glass) | $78 \times 10^{-7}$ | $0.95 \times 10^{-5}$ |

TABLE 15

| | ΔLBS (mm) | ΣΔLBS (mm) |
|---|---|---|
| (1) Change in the axial chromatic aberration of collimater lens 2 and scanning lenses 207, 208, 209 | 0.7145 | 2.5633 |
| (2) Change of the refractive power of collimater lens 2 | −0.1029 | |
| (3) Change of the refractive power of scanning lenses 207, 208, 209 | 2.4780 | |
| Spatial Fluctuation between the collimater lens 2 and semiconductor laser element 1 | −0.5263 | |

TABLE 16

| Material | Linear Thermal Coefficient of Expantion α (mm/degree) | Temparture Change Rate of refractive index dn/dT (1/degree) |
|---|---|---|
| SF57 (Glass) (collimeter lens 2 and scanning lens 207) | $79 \times 10^{-7}$ | $0.26 \times 10^{-5}$ |
| BK7 (Glass) (cylindorical lens 203, scanning lens 208, 209 and cover glass) | $78 \times 10^{-7}$ | $0.95 \times 10^{-5}$ |
| Amorphous polyolefin (rasin) (cylindrical lenses 204, 211) | $700 \times 10^{-7}$ | $-12 \times 10^{-5}$ |

TABLE 17

| f1 (mm) | f2 (mm) | d (mm) | S (mm) |
|---|---|---|---|
| 20 | −12 | 6.56 | 49 |
| 25 | −20 | 5.70 | 65 |
| 30 | −30 | 4.00 | 78 |
| 35 | −40 | 3.20 | 85 |
| 40 | −55 | 0.00 | 97 |

TABLE 18

|  | ΔLBS (mm) | ΣΔLBS (mm) |
|---|---|---|
| (4) Change of the refrective power of cylindrical lenses 203, 204, 211 | −1.270 | −1.234 |
| (5) Change in the axial chromatic aberration of cylindrical lenses 203, 204, 211 | 0.036 |  |

What is claimed is:

1. A light source device comprising:

a laser light source which emits a laser beam a collimator lens which incidents the laser beam emitted from said laser light source;

a lens barrel having a first linear thermal coefficient of expansion and holding said collimator lens;

a lens barrel support member having said first linear thermal coefficient of expansion and holding said lens barrel, and engages said lens barrel at a surface parallel to an optical axis of said collimator lens; and a laser support member having a second linear thermal coefficient of expansion different from said first linear thermal coefficient of expansion and supporting said laser light source, said laser element support member joining said lens barrel support member at a surface perpendicular to the optical axis of said collimator lens, said first and second linear thermal coefficients of expansion causing a predictable change in focus of light emitted from the collimator lens when said lens unit is subjected to a temperature fluctuation.

2. A light source device as claimed in claim 1, wherein said lens barrel support member includes two inclined surfaces together defining a V-shaped channel parallel to an optical axis of said collimator lens, said V-shaped channel supporting said lens barrel.

3. A light source device as claimed in claim 1, wherein aluminum is used as a material for both said lens barrel and said lens barrel support member.

4. A light source device as claimed in claim 1, further comprising means for mounting said laser support member so that a position of said laser light source is adjustable bidimensionally within a plane perpendicular to the optical axis of said collimator lens.

5. A light source device as claimed in claim 1, wherein iron subjected to a nickel surfacing process is used as a material for said laser support member.

6. A laser scanning device comprising:

a first light source device including a laser light source which emits a laser beam to scan a scanned surface, a collimator lens for confining the laser beam emitted from said laser light sources, a lens barrel for holding said collimator lens, a lens barrel support member which is formed of a same type of material as that of said lens barrel and engages said lens barrel at a surface parallel to an optical axis of said collimator lens, and a laser support member formed of a different type material from that of said lens barrel support members, said laser support member supporting said laser light source and joining said lens barrel support member at a surface perpendicular to the optical axis of said collimator lens;

a deflector which deflects the laser beam emitted from said first light source device;

a lens system which converges the laser beam emitted from said first light source device for forming a spot on the scanned surface; and means for adjusting the lens system to compensate for changes in focal length induced by environmental temperature fluctuation.

7. A laser scanning device as claimed in claim 6, further comprising:

a second light source device which emits a laser beam to scan said scanned surface; and a deflecting means for deflecting a laser beam emitted from said second light source so that the deflected laser beam emitted from the second light source is parallel with the laser beam emitted from the first light source.

8. A laser scanning device as claimed in claim 7, wherein the second light source device is identical to the first light source device.

9. A laser scanning device as claimed in claim 6, wherein said lens system includes a first lens having a positive reflective power, and which is made of glass; and a second lens having a negative reflective power, and which is made of resin, said first and second lenses located between said light source device and said scanned surface.

10. A laser scanning device as claimed in claim 9, wherein both said first lens and said second lens have a reflective power only in a subscan direction.

11. A laser scanning device as claimed in claim 6, wherein said adjusting means comprises:

a focusing lens located between said first light source device and said scanned surface; and moving means associated with said focusing lens to move said focusing lens in an optical axis direction.

12. A laser scanning device as claimed in claim 11, further comprising:

a motor which drives said moving means;

a drive control unit which outputs a control signal to said motor;

a temperature sensor which outputs a signal in accordance with the temperature; and a calculation unit which controls said drive control unit based on the signal from said temperature sensor.

* * * * *